(12) United States Patent
Ellis et al.

(10) Patent No.: US 7,691,437 B2
(45) Date of Patent: Apr. 6, 2010

(54) METHOD FOR PREPARING A PRESSURE-SENSITIVE ADHESIVE

(75) Inventors: Mark F. Ellis, St. Paul, MN (US);
Siegfried R. Goeb, Willich (DE);
Andreas H. Graichen, Hilden (DE);
Frank Kuester, Dusseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 1234 days.

(21) Appl. No.: 10/698,201

(22) Filed: Oct. 31, 2003

(65) Prior Publication Data
US 2005/0095370 A1 May 5, 2005

(51) Int. Cl.
| B05D 5/10 | (2006.01) |
| C08J 3/28 | (2006.01) |
| C08F 2/46 | (2006.01) |
| B29C 71/02 | (2006.01) |
| B05D 3/06 | (2006.01) |
| B05D 3/02 | (2006.01) |

(52) U.S. Cl. .............. 427/207.1; 427/208.4; 427/532; 427/542; 427/553; 427/557; 427/558; 522/109; 522/113

(58) Field of Classification Search .......... 427/207.1, 427/208.4, 493, 508, 558, 561, 595; 522/109–112
See application file for complete search history.

(56) References Cited

U.S. PATENT DOCUMENTS

| 3,661,618 | A | | 5/1972 | Brookman et al. |
| 3,840,448 | A | | 10/1974 | Osborn et al. |
| 4,181,752 | A | | 1/1980 | Martens et al. |
| 4,303,485 | A | * | 12/1981 | Levens ................... 522/12 |
| 4,379,201 | A | * | 4/1983 | Heilmann et al. .......... 428/345 |
| 4,478,876 | A | * | 10/1984 | Chung ..................... 427/515 |
| 5,028,484 | A | * | 7/1991 | Martin et al. .............. 428/352 |
| 5,077,870 | A | | 1/1992 | Melbye et al. |
| 5,461,087 | A | | 10/1995 | Takahashi et al. |
| 5,462,975 | A | | 10/1995 | Yamamoto et al. |
| 5,637,646 | A | * | 6/1997 | Ellis ...................... 525/309 |
| 5,721,289 | A | | 2/1998 | Karim et al. |
| 5,741,542 | A | * | 4/1998 | Williams et al. .......... 427/208.4 |
| 5,753,768 | A | | 5/1998 | Ellis |
| 5,773,485 | A | | 6/1998 | Bennett et al. |
| 5,856,022 | A | | 1/1999 | McCormick et al. |
| 5,986,011 | A | | 11/1999 | Ellis |
| 6,103,152 | A | | 8/2000 | Gehlsen et al. |
| 6,174,931 | B1 | * | 1/2001 | Moon et al. ..................... 522/4 |
| 6,232,365 | B1 | * | 5/2001 | Weiss et al. ................. 522/178 |
| 6,340,719 | B1 | * | 1/2002 | Goeb et al. ................. 522/174 |
| 6,586,482 | B2 | | 7/2003 | Gehlsen et al. |
| 6,866,899 | B2 | * | 3/2005 | Wright ...................... 427/516 |
| 2001/0028953 | A1 | | 10/2001 | Bluem et al. |
| 2004/0137222 | A1 | * | 7/2004 | Welke et al. ............... 428/343 |
| 2005/0209360 | A1 | * | 9/2005 | Graichen et al. ........... 522/178 |

FOREIGN PATENT DOCUMENTS

| EP | 0 866 810 B1 | | 3/2002 |
| EP | 1375617 A1 | * | 1/2004 |

OTHER PUBLICATIONS

EPO Communication pursuant to Article 94(3) EPC, dated Nov. 18, 2008.

* cited by examiner

Primary Examiner—Timothy H Meeks
Assistant Examiner—Cachet I Sellman

(57) ABSTRACT

The present invention relates to a method of preparing a pressure-sensitive adhesive comprising the steps of:
(i) providing an essentially solvent-free mixture comprising one or more free radically polymerizable monomers having one ethylenically unsaturated group and at least one free-radical polymerization initiator,
(ii) partially polymerizing said mixture to provide a partially polymerized mixture exhibiting a Brookfield viscosity of between 1,000 and 125,000 mPa·s at 20° C. and a degree of conversion of monomers to polymer of between 30-60 wt. % with respect to the initial mass of the monomers prior to polymerization,
(iii) adding one or more free-radical radiation polymerization initiators to the partially polymerized mixture to provide a radiation-curable precursor,
(iv) applying the radiation-curable precursor to a substrate, and
(v) further polymerizing the radiation-curable precursor by subjecting it to actinic irradiation to provide said pressure-sensitive adhesive.

15 Claims, No Drawings

METHOD FOR PREPARING A PRESSURE-SENSITIVE ADHESIVE

BACKGROUND

The present invention relates to a method of preparing a pressure-sensitive adhesive comprising providing a coatable partially polymerized radiation-curable precursor of the adhesive and applying the precursor to a substrate with subsequent further polymerization.

Pressure-sensitive adhesives can be applied to a substrate as pre-cured adhesive tapes which may be die-cut to the required shape. While this technique is convenient for many technical applications and does, in particular, usually not require any in-situ curing step, it may be disadvantageous in other technical applications for the following reasons:

Double-coated adhesive tapes usually require the use of one or more release liners which have to be discarded upon application of the adhesive tape. When die-cutting the adhesive tape to the desired shape, the excess tape has to be discarded as well.

Especially in the electronics industry the shapes of the substrates to be adhered tend to get smaller and more complicated so that the die-cutting of the adhesive tape tends to become more difficult and technically demanding.

U.S. Pat. No. 4,181,752 discloses a process for the preparation of a normally tacky pressure-sensitive adhesive comprising subjecting a suitable radiation-sensitized solventless liquid mixture containing as a major proportion thereof at least one acrylic acid ester of an alkyl alcohol containing from 4-14 carbon atoms, and at least one monomer copolymerizing therewith to prepolymerizing conditions to form a relatively viscous partially polymerized mixture or syrup in which about 5-10% of the monomers have been converted to polymers, applying said partially polymerized mixture to a substrate in a thickness of up to about 1.9 cm in thickness and subjecting it to radiation in the near UV-region at a rate of from 0.1-7 mW/cm$^2$ of the partially polymerized mixture exposed.

The further polymerization of the partially polymerized mixture of U.S. Pat. No. 4,181,752 is carried out in an inert atmosphere such as $N_2$, $CO_2$, He or Ar which is disadvantageous for various practical applications. The method of forming the partially polymerized mixture used in U.S. Pat. No. 4,181,752 provide a coatable viscosity of the partially polymerized mixture only at low degrees of conversion of the monomers to polymers of typically less than about 10%. Due to the low degree of conversion of the monomers to polymer the further polymerization of the partially polymerized mixture requires the application of UV-irradiation with a relatively high energy density which may damage, for example, a substrate the partially polymerized mixture is applied to. If the degree of conversion of the monomers to polymers is increased, the viscosity of the partially polymerized mixture tends to become very high rendering the mixture non-coatable. It was also found that if the degree of conversion of monomers to polymer is increased, the resulting partially polymerized mixture tends to gel and/or become inhomogeneous.

It was a desire of the present invention to provide a method of preparing a pressure-sensitive adhesive comprising the preparation of a partially pre-polymerized coatable radiation-curable precursor with subsequent further polymerization to a pressure-sensitive adhesive with advantageous properties which does not exhibit the drawbacks of previously known methods or exhibits such drawbacks to a limited degree only.

It was another desire of the present invention to provide a coatable radiation-curable precursor of a pressure-sensitive adhesive which can be polymerized in a non-inert atmosphere.

SUMMARY

The present invention relates to a method of preparing a pressure-sensitive adhesive comprising the steps of:
(i) providing an essentially solvent-free mixture comprising one or more free radically polymerizable monomers having one ethylenically unsaturated group and at least one free-radical polymerization initiator,
(ii) partially polymerizing said mixture to provide a partially polymerized mixture exhibiting a Brookfield viscosity of between 1,000 and 125,000 mPa·s at 20° C. and a degree of conversion of monomers to polymer of between 30-60 wt. % with respect to the mass of the monomers prior to polymerization,
(iii) adding one or more free-radical radiation polymerization initiators to the partially polymerized mixture to provide a radiation-curable precursor,
(iv) applying the radiation-curable precursor to a substrate, and
(v) further polymerizing the radiation-curable precursor by subjecting it to actinic irradiation to provide said pressure-sensitive adhesive.

The present invention furthermore relates to a radiation-curable precursor obtainable by performing steps (i)-(iii) of the method of the present invention. The polymer obtained by conversion of the monomers to polymer to a degree of between 30-60 wt. % which is comprised in the radiation-curable precursor, preferably has a polydispersity $\rho = M_w/M_n$ between 2 and 3.

The present invention furthermore relates to a pressure-sensitive adhesive tape comprising a backing bearing at least one layer of a pressure-sensitive adhesive which is obtainable by the method of the present invention.

DETAILED DESCRIPTION

In the first step (i) of the method of the present invention an essentially solvent-free mixture is provided comprising one or more free-radically polymerizable monomers comprising an ethylenically unsaturated group

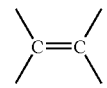

and at least one free-radical polymerization initiator.

Examples of suitable ethylenically unsaturated groups include vinyl, vinylene, allyl and, in particular, (meth)acrylate groups.

Monomers comprising one ethylenically unsaturated group which are useful in the present invention can be distinguished in view of their polarity or in view of the glass transition temperature of a homopolymer obtained by radically polymerizing the respective monomer.

The term polar monomers includes both moderately polar and strongly polar monomers. Polarity (i.e., hydrogen-bonding ability) is frequently described by the use of terms such as "strongly", "moderately" and "weakly". References describing these and other solubility terms include Paint Testing Manual, 3$^{rd}$ ed., G. G. Seward, Ed., American Society for Testing and Materials, Philadelphia, Pa., and "A Three-Dimensional Approach to Solubility", Journal of Paint Technology, Vol. 38, No. 496, pp. 269-280.

Suitable examples for weakly polar monomers include, for example, linear or branched monofunctional unsaturated acrylates or methacrylates of non-tertiary alkyl alcohols, the alkyl groups of which have from 4 to 15 and, in particular, from 4 to 14 carbon atoms. Examples of these lower alkyl acrylates used in the invention include but are not limited to, n-butyl acrylate, isobutyl acrylate, hexyl acrylate, 2-ethyl-hexyl acrylate, isooctyl acrylate, n-octyl acrylate, n-octyl methacrylate, 2-methylbutyl acrylate, isononyl acrylate, n-nonyl acrylate, isoamylacrylate, n-decyl acrylate, isodecyl acrylate, isodecyl methacrylate, isobornyl acrylate, 4-methyl-2-pentyl acrylate, dodecyl acrylate, ethoxy-ethoxyethy-lacrylate and 2-acrylic acid-2-((butylamino)carbonyl)oxy-ethyl ester. Preferred lower acrylate and methacrylate esters include isooctyl acrylate, n-butyl acrylate, 2-ethylhexyl acrylate, isononyl acrylate, ethoxy-ethoxyethylacrylate, isobornyl acrylate and dodecyl acrylate.

Strongly polar monomers which are suitable in the present invention include, for example, acrylic acid, methacrylic acid and acrylamides. N-vinyl lactams such as, for example, N-vinyl pyrrolidone or N-vinyl caprolactam, acrylonitrile, acryloylmorpholine and dimethyl amino-propyl methacrylate are examples for moderately polar polymers.

Low $T_G$ monomers having one ethylenically unsaturated group and a glass transition temperature of the corresponding homopolymer of less than 0° C. which are suitable in the present invention include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethyleng-lycol-monomethacrylate, laurylacrylate, tetrahydrofurfuryl-acrylate, ethoxy-ethoxyethyl acrylate and ethoxylated-nony-lacrylate. Especially preferred are 2-ethyl-hexylacrylate, ethoxy-ethoxyethyl acrylate, tridecylacrylate and ethoxy-lated nonylacrylate.

High $T_G$ monomers having one ethylenically unsaturated group and a glass transition temperature of the corresponding homopolymer of 50° C. or more which are suitable in the present invention, include, for example, N-vinylpyrrolidone, N-vinyl caprolactam, isobornyl acrylate, acryloylmorpho-line, isobornylmethacrylate, phenoxyethylacrylate, phenoxyethylmethacrylate, methylmethacrylate and acrylamide. Especially preferred are N-vinylpyrrolidone, and acryloyl-morpholine.

The mixture preferably comprises at least 2 and more preferably at least 3 monomers each having one ethylenically unsaturated group and, in particular, a (meth)acrylate group. The mixture preferably comprises at least 40 wt. % and more preferably at least 50 wt. % with respect to the mass of the mixture of one or more weakly polar monomers comprising one ethylenically unsaturated group and, in particular, a (meth)acrylate group.

In a preferred embodiment, the mixture comprises one or more polar copolymerizable (meth)acrylate monomers to improve cohesion in the final pressure-sensitive adhesive and its adhesion, in particular, to metal substrates.

If the mixture comprises one or more strongly polar copolymerizable monomers with one ethylenically unsaturated group and, in particular, with a (meth)acrylate group, the amount of such monomers preferably is less than about 25 wt. %, more preferably less than about 15 wt. % and especially preferably between 1 and 15 wt. % with respect to the mass of the mixture.

If the mixture comprises one or more moderately polar copolymerizable monomers, the amount of such monomers preferably is less than about 40 wt. % and more preferably between about 5 and 40 wt. % of the mixture.

In another preferred embodiment, the mixture comprises at least one low $T_G$ monomer having one ethylenically unsaturated group and, in particular, a (meth)acrylate group and at least one high $T_G$ monomer having one ethylenically unsaturated group and, in particular, a (meth)acrylate group. The ratio of the mass of such one or more low $T_G$ monomers to the mass of such one or more high $T_G$ monomers preferably is between 1 to 20 and more preferably between 1 to 10.

The mixture further comprises an effective amount of one or more free-radical polymerization initiators. The free-radical polymerization initiators and their amount and the polymerization conditions are selected to effect a partial polymerization of the mixture providing the required conversion of monomers to polymer to a degree of between 30-60 wt. % with respect to the mass of the monomers prior to polymerization, and a viscosity of the partially cured mixture of between 1,000-125,000 mPa·s at 20° C. The term "free-radical polymerization initiators" as used above and below includes initiators which can be thermally activated or activated by actinic radiation such as, in particular, UV-radiation.

Since the mixture preferably is partially prepolymerized in step (ii) under essentially adiabatic polymerization conditions, the mixture preferably comprises one or more thermally activatable free-radical polymerization initiators. Suitable thermally activatable free-radical polymerization initiators include organic peroxides, organic hydroperoxides, and azo-group initiators which produce free-radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the Vazo™ (compounds manufactured by DuPont, such as Vazo™ 52 (2,2'-azobis(2,4-dimethylpentanenitrile)), Vazo™ 64 (2,2'-azobis(2-methyl-propanenitrile)), Vazo™ 67 (2,2'-azobis(2-methylbutanenitrile)), and Vazo™ 88 (2,2'-azobis(cyclohex-ane-carbonitrile)).

The term "essentially adiabatic polymerization" as used above and below means that total of the absolute value of any energy exchanged to or from the reaction system in which the polymerization of the mixture to a degree of conversion of between 30-60 wt. % to provide the partially polymerized mixture, takes place, will be less than about 15% of the total energy liberated during said polymerization of the mixture. Expressed mathematically, the essentially adiabatic criterion is $$\int_{t_1}^{t_2} \sum_{j=1}^{N} |q_j q(t)| dt \le f \cdot \int_{x_1}^{x_2} \Delta H_p(x) dx$$

where
f is about 0.15
$\Delta H_p$ is the heat of polymerization
x is the conversion of monomers $$\frac{C_0 - C}{C_0}$$

by mole percent

C is the concentration of monomers after the partial polymerization step $C_0$ is the initial concentration of monomers $X_1$ is the polymer fraction at the start of the polymerization of the mixture to the radiation-curable precursor $X_2$ is the polymer fraction at the end of the polymerization of the mixture to the radiation-curable precursor t is the time $t_1, t_2$ are the start time and end time, respectively, of the polymerization reaction of the mixture to the radiation-curable precursor $q_j(t)$ with j=1, 2, . . . N is the rate of energy transferred to the reaction system from the surroundings from all N sources of energy flow into the system The term monomers as used above and below refers to monomers having one ethylenically unsaturated group, monomers having two or more ethylenically unsaturated groups and further monomers being copolymerizable with them in the polymerization reaction of the present invention.

In the preferred method of the present invention, the reaction system in which the adiabatic polymerization of the mixture to a degree of conversion of monomers to polymer between 30-60 wt. % to provide the partially cured mixture takes place, preferably is a batch reactor. By reacting batchwise is meant that the polymerization reaction of the mixture occurs in a vessel where the partially cured mixture is drained from the vessel at the end of the polymerization and not continuously during the reaction. The one or more monomers comprising an ethylenically unsaturated group, the one or more free-radical polymerization initiators and, optionally, further monomers and additives can be charged to the vessel at one time prior to reacting, in steps over time while reacting, or continuously over a time period while reacting, and the polymerization reaction is allowed to proceed for the necessary amount of time to achieve the desired degree of conversions of said one or more monomers to polymer to a degree of between 30-60 wt. %.

If necessary, further monomers or additives can be mixed into the batch subsequent to the polymerization reaction and prior to draining. When the polymerization of the mixture is complete and a conversion of the reactive monomers to polymer to a degree of between 30-60 wt. % has been obtained, the resulting radiation-curable precursor is drained from the reaction vessel.

A typical batch reactor suitable for adiabatic polymerization will comprise a pressure vessel constructed of material suitable for the partial polymerization of the mixture, such as stainless steel which is commonly used for many types of free-radical polymerization. Typically, the pressure vessel will have ports for charging raw materials, removing product, emergency pressure relief, pressurizing the reactor with inert gas, pulling vacuum on the reactor head space, etc. Typically, the vessel is enclosed partially in a jacket through which a heat transfer fluid (such as water) is passed for heating and cooling the contents of the vessel. Typically, the vessel contains a stirring mechanism such as a motor-driven shaft inserted into the vessel to which stirring blades are attached. Commercial batch reaction equipment typically is sized in the range of about 10 to about 20,000 gallons (37.9 to 75,708 liters), and can be custom-built by the user or can be purchased from vendors such as Pfaudler U.S., Inc., of Rochester, N.Y.

Extreme caution must be exercised to ensure that the reaction vessel suitable for adiabatic polymerization can contain the elevated vapour pressure during the polymerization of the mixture, at the temperatures that will be encountered, particularly if the polymerization of the mixture should proceed faster or further than desired because of an accidental overcharge/mischarge of the free-radical polymerization initiator(s). It is also very important to ensure the mixture will not decompose during polymerization at the temperatures encountered to form gaseous product that could dangerously elevate the vessel pressure. Small-scale adiabatic calorimetric experiments, which one skilled in the art would be readily capable of performing, can be used to determine the runaway characteristics for particular initiators. For example, the Reactive System Screening Tool (RSST) or the Vent Sizing Package (VSP), both available from Fauske and Associates, Inc. of Burr Ridge, Ill., are devices capable of investigating runaway reaction characteristics and severity.

When the one or more monomers comprising an ethylenically unsaturated group and the one or more free-radical polymerization initiators are mixed to provide the mixture, there will be a temperature above which the mixture begins to react substantially (rate of temperature rise typically greater than about 0.1° C./min for essentially adiabatic conditions). This temperature, which depends on factors including the monomer(s) comprising one ethylenically unsaturated group being reacted, the concentration of such monomer(s), the particular free-radical polymerization initiator(s) being used, the amounts of such initiator(s) used, and the amount of any further components or additives such as, for example, polymers or any solvent in the mixture, will be defined herein as the "runaway onset temperature". As an example, as the amount of a radiation-curable polymerization initiator is increased, its runaway onset temperature in the reaction mixture will decrease. At temperatures below the runaway onset temperature, the amount of polymerization proceeding will be practically negligible. At the runaway onset temperature, assuming the absence of reaction inhibitors and the presence of essentially adiabatic reaction conditions, the free-radical polymerization begins to proceed at a meaningful rate and the temperature will start to accelerate upwards, commencing the runaway reaction.

According to the present invention, a sufficient amount of free-radical polymerization initiator(s) is used to carry the polymerization to the desired temperature and conversion. If too much initiator(s) is used, an excess of low molecular weight polymer will be produced thus broadening the molecular weight distribution, i.e., increasing the polydispersity $\rho = M_w/M_n$. Low molecular weight components can degrade the performance of the pressure-sensitive adhesive finally obtained. If too little initiator is used, the polymerization will not proceed appreciably and the reaction will either stop or will proceed at an impractical rate. The amount of an individual free-radical polymerization initiator used depends on factors including its efficiency, its molecular weight, the molecular weight(s) of the monomer(s) comprising ethylenically unsaturated group, the heat(s) of reaction of such monomer(s), the types and amounts of other free-radical polymerization initiators included, etc. The total amount of the one or more free-radical polymerization initiators typically is in the range of about 0.0005 wt. % to about 0.5 wt. % and preferably in the range of about 0.001 wt. % to about 0.1 wt. % based on the total weight of the one or more monomers in the mixture.

When more than one free-radical polymerization initiator is used in the reaction, as the first initiator depletes during an essentially adiabatic reaction (with the corresponding increasing reaction temperature), the second initiator may be selected such that it is thermally activated when the first initiator is becoming depleted. That is, as the first initiator is depleting, the reaction has brought the reaction mixture to the runaway onset temperature for the second initiator in the reaction mixture. An overlap is preferred such that before one initiator completely depletes, another initiator activates (reaches its runaway onset temperature). Without an overlap, the polymerization rate can slow or essentially stop without external heating to bring the mixture to the runaway onset temperature of the next initiator in the series. This use of external heating defeats one of the benefits of the inventive process by adding the potential for nonuniform temperature distribution in the reaction mixture due to the external heating.

Until the temperature increases towards the runaway onset temperature for an individual free-radical polymerization initiator in the batch, such initiator is essentially dormant, not appreciably decomposing to form free-radicals. It will remain dormant until the reaction temperature increases towards its runaway onset temperature in the reaction mixture and/or until external heat is applied.

The succession of the one free-radical polymerization initiator depleting and another reaching its runaway onset temperature can continue as the temperature rises for virtually any number of thermal free-radical polymerization initiators in the reaction system. In the limit, a succession of virtually an infinite number of different free-radical polymerization initiators could be used with nearly complete overlap of the active temperature ranges between adjacent free-radical polymerization initiators in the succession to bring about the polymerization and the corresponding adiabatic temperature rise. In this case, the amount of each free-radical polymerization initiator used would need to be virtually infinitesimally small so as to not detrimentally broaden the molecular weight distribution.

Practically, to minimize raw material handling requirements, a reasonable minimum number of initiators should be used to achieve the desired amount of adiabatic polymerization and obtain the necessary polymer properties. Typically, 1 to 5 different free-radical polymerization initiators (more typically 1 to 3) are used during a particular reaction cycle of the polymerization of the mixture. The required degree of conversion of the one or more monomers comprising an ethylenically unsaturated group to polymer of about 30 wt. % to about 60 wt. % is preferably obtained in one reaction cycle, but it is also possible to conduct the polymerization of the mixture to the required degree of conversion of monomers to polymer in 2 or more subsequent reaction cycles.

To estimate the amount of overlap between successive initiators in a series during an essentially adiabatic polymerization, standard polymerization modelling techniques can be employed (i.e., W. H. Ray, "On the mathematical modelling of polymerization reactors", J. Macromol. Sci. Macromol. Chem., C8(1), 1, 1972). The selection of two or more free-radical polymerization initiators with a sufficient overlap and, in particular, with a preferred minimum and maximum overlap, is discussed in detail in EP 0 866 810 B1 (p. 11, line 41 to p. 13, line 54). The criteria disclosed in such reference for selecting suitable free-radical polymerization initiators are also applicable in the present invention, and the passage referred to above is incorporated herein by reference.

The mixture may optionally comprise one or more monomer compounds comprising two or more ethylenically unsaturated groups

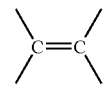

in an amount of between 0-3 wt. % with respect to the mass of the mixture.

Examples of suitable monomer compounds comprising two or more ethylenically unsaturated groups include $C_2$-$C_{12}$ hydrocarbondiol diacrylates such as 1,6-hexanediol diacrylate, $C_4$-$C_{14}$ hydrocarbon divinylethers such as hexanediol divinylether and $C_3$-$C_{12}$ hydrocarbontriol triacrylates such as trimethylolpropane triacrylate. Two or higher acrylate functional monomers and, in particular, di- or triacrylate-functional monomers are preferred.

In a preferred embodiment of the present invention, the amount of monomers with an unsaturated ethylene-functionality of two or higher and, in particular, with an (meth)acrylate functionality of 2 or 3, in the mixture is less than 3.0 wt. % and more preferably less than 2.0 wt. % with respect to the mass of the mixture. Including monomers having two or more ethylenically unsaturated groups into the mixture results in cross-linking which tends to increase the viscosity of the partially cured mixture obtained by polymerizing the mixture. The partially cured mixture preferably has a Brookfield viscosity of between 1,000 to 125,000 mPa·s, more preferably of between 1,000 and 100,000 mPa·s and especially preferably of between 1,000 and 50,000 mPa·s at 20° C. If the radiation-curable precursor obtained in step (iii) is to be applied to a substrate by printing, the partially curable mixture preferably has a Brookfield viscosity at 20° C. of between 1,000 and 25,000 mPa·s and more preferably between 2,000 and 20,000 mPa·s.

In view of this, the amount of the one or more monomers having two or more ethylenically unsaturated groups preferably is between 0-3 wt. % with respect to the mass of the mixture.

The mixture may also comprise one or more chain transfer agents in order to control the molecular weight of the polymer obtained by the polymerization of the mixture or other polymer properties. The term "chain transfer agent" as used herein also includes "telogens". Suitable chain transfer agents for use in the method of the invention include but are not limited to those selected from the group consisting of carbon tetrabromide, hexabromoethane, bromotrichloromethane, 2-mercaptoethanol, t-dodecylemercaptan, isooctylthioglycolate, 3-mercapto-1,2-propanediol, cumene, and mixtures thereof. Depending on the reactivity of a particular chain transfer agent and the amount of chain transfer desired, typically 0 to about 1 wt. % of chain transfer agent is used, preferably 0 to about 0.5 wt. %, based upon the total weight of the mixture.

The viscosity of the radiation-curable precursor can be further adjusted by including oligomeric or polymeric, respectively, non-reactive additives such as, for example, tackifiers including rosin esters, synthetic hydrocarbons and terpene resins and plasticizers.

The amount of one or more tackifiers with respect to the mass of the mixture can be up to 50 wt. %, more preferably up to 40 wt. % and especially preferably between 0.5-35 wt. % with respect to the mass of the mixture.

It is also possible to include oligomeric or polymeric, respectively, additives comprising one or more ethylenically unsaturated groups. Oligomeric and polymeric, respectively, additives of this type are commercially available. Oligomeric or polymeric additives, respectively, which are useful in the present invention, preferably exhibit a ring and ball softening point of at least 50° C. The acrylic ester resin AC Resin 258, available from BASF, Ludwigshafen, Germany, is an example for a commercially available resin comprising a crosslinkable group.

The mixture of the present invention preferably is essentially solventless so that the polymerization reaction can take place as true bulk polymerization where the polymer formed as well as the monomers comprising one ethylenically unsaturated group and, optionally, monomers comprising two or more ethylenically unsaturated groups or other polymerizable monomers all being miscible. However, the monomers may in some cases require a solvent in order to (co)polymerize. For example, acrylamides may be dissolved in a small amount of solvent in order to make them miscible with isooctyl acrylate. Therefore, the process according to the invention includes within its scope the use of solvents which are non-reactive in the free-radical polymerization being carried out. Such solvents usually comprise less than about 20 wt. %, more preferably less than about 10 wt. % and especially preferably between 0-5 wt. % based on the total weight of the mixture. Useful solvents are those that are miscible in the mixture including but not limited to organic solvents such as toluene, hexane, pentane, and ethyl acetate. Solvents may also enhance the process according to the invention, so as to reduce the viscosity of the polymer at the end of the polymerization to facilitate draining or subsequent processing. Unless necessary, however, addition of solvents is not preferred because they can present the same disadvantages as solution polymerization, although to a lower degree when the solvent concentration is low.

The mixture may comprise in addition to the one or more monomers comprising one ethylenically unsaturated group and to the one or more free-radical polymerization initiators further components and additives which include, without limitation, defoaming agents, heat stabilizers, antioxidants, antistatic agents, thickeners, fillers, pigments, dyes, colorants, thixotropic agents, electrically conductive particles, thermally conductive particles, processing aides, nanoparticles, fibers and any combination thereof.

The amount of one or more potential further additives is selected so that it does not adversely affect the properties of the radiation-curable precursor such as, for example, its viscosity and/or the properties of the pressure-sensitive adhesive finally obtained.

In the second step (ii) of the method of the present invention, the mixture is polymerized to a degree of conversion of the one or more reactive monomers to polymer of between 30-60 wt. % with respect to the initial mass of the monomers prior to polymerization.

The polymerization of the mixture if performed adiabatically, preferably proceeds as follows. The one or more monomers comprising one ethylenically unsaturated group and, optionally, one or more monomers comprising two or more ethylenically unsaturated groups and/or further copolymerizable monomers, are charged to the reactor in the desired amount(s). The temperature of the reaction vessel must be cool enough so that virtually no thermal polymerization of the reactive monomer(s) will occur and also cool enough so that virtually no polymerization will occur when the free-radical polymerization initiator(s) are added to the batch. Also, care should be taken to ensure the reactor is dry, in particular, free of any undesired volatile solvent (such as reactor cleaning solvent) which potentially could dangerously elevate the pressure of the reaction vessel as the temperature increases due to heat of polymerization. The initiator(s), optional chain transfer agents, optional polymer, optional crosslinking agents, optional solvent, etc., are also charged to the reactor.

Prior to warming the mixture as described below (or optionally simultaneously while warming the batch), after adding all components to the batch as described above, the batch is purged of oxygen. De-oxygenation procedures are well known to those skilled in the art of free-radical polymerization. For example, de-oxygenation can be accomplished by bubbling an inert gas such as nitrogen through the batch to displace dissolved oxygen.

After completing the de-oxygenation, the head space in the reactor is typically pressurized with an inert gas such as nitrogen to a level necessary to suppress boiling of the reaction mixture as the temperature rises during reaction. The inert gas pressure also prevents oxygen from entering the polymerization mixture through possible small leaks in the reaction equipment while polymerization is in progress.

From heating provided by the jacket on the reactor, the mixture temperature typically is raised to or in a range about 1° C. to about 5° C. above the runaway onset temperature with sufficient mixing in the batch to have an essentially uniform temperature in the batch. The batch temperature controller is typically set temporarily to maintain the batch at the runaway onset temperature. Once the jacket temperature begins to drop as necessary to hold the batch at the runaway onset temperature, this indicates that the polymerization has begun. The reaction may not proceed immediately when the batch is brought to the runaway onset temperature because it may take time to deplete reaction inhibitors that are typically shipped with the reactive monomers (to prevent unwanted polymerization during shipping and handling), other trace impurities, or any oxygen still dissolved in the mixture. As soon as the jacket temperature drops, the reactor jacket temperature control system is set to track the batch temperature as it increases, due to reaction, to facilitate essentially adiabatic reaction conditions. In the practice of the process according to the invention, it has been found beneficial to have the jacket temperature about 1° C. to about 10° C. above the batch temperature to warm the reactor walls from the jacket as opposed to warming the reactor walls from the heat of reaction of the mixture, making the reacting system more adiabatic. Acknowledged is the fact that perfect adiabaticy is probably not attainable because there will typically be a small amount of heat transferred from the reacting medium to the internal agitator blades and shaft as well as the mixing baffles in the reactor. In the practice of this invention the effect of heat loss to heating the agitator shaft and blades, baffles, temperature probes, etc., has been found to be negligible.

An alternate heating approach would be to gently warm the batch past the runaway onset temperature with heat input from the jacket to warm the batch at a rate of about 0.1° C./min to about 0.5° C./min and continue the heating through the reaction cycle (similar to the heating approach above with the jacket temperature about 1° C. to about 10° C. above the batch temperature). As in the heating approach above, continued heating through the reaction cycle would serve to offset the heat loss to the reaction equipment and maintain essentially adiabatic reaction conditions. In the practice of the present invention, the first heating approach described above appears preferable because it ensures the reaction will always commence at the same temperature which seems to produce more reproducible product from batch to batch.

The polymerization of the mixture typically reaches the required degree of conversion of the reactive monomers to polymer of between 30-60 wt. % in one reaction cycle although it is also possible to conduct two or more subsequent reaction cycles. When the polymerization reaction approaches its end, the reaction temperature peaks which is due to the depletion of the free-radical polymerization initiators, as well as negligible reaction of the reactive monomers from thermal polymerization. If desired, the polymerization reaction can be stopped at this point, for example, by injecting oxygen into the reactor.

In the third step (iii) of the present invention, one or more free-radical radiation polymerization initiators are added to the partially polymerized mixture to provide the radiation-curable precursor. The term "free-radical radiation polymerization initiator" as used above and below comprises free-radical polymerization initiators which can be activated by some kind of actinic radiation such as for example, light sources, especially UV-light sources, or e-beam sources. Activation by light sources and, especially, UV-light sources is preferred. Free-radical radiation polymerization initiators which can be activated by light, are often referred to as free-radical photoinitiators. Radiation-curable precursors which include one or more photoinitiators are preferred.

The free-radical photoinitiators which are suitable in the present invention preferably include both type I and type II photoinitiators.

Type I photoinitiators are defined to essentially undergo a unimolecular bond cleavage reaction upon irradiation thereby yielding free-radicals. Suitable type I photoinitiators are selected from a group consisting of benzoin ethers, benzil ketals, α-dialkoxyacetophenones, α-hydroxyalkylphenones and acylphosphine oxides. Suitable type I photoinitiators are commercially available, for example, as Esacure KIP 100 from Lamberti Spa, Gallarate, Italy, or as Irgacure 651 from Ciba-Geigy, Lautertal, Germany.

Type II photoinitiators are defined to essentially undergo a bimolecular reaction where the photoinitiators interact in an excited state with a second compound acting as co-initiator, to generate free-radicals. Suitable type II photoinitiators are selected from a group comprising benzophenones, thioxanthones and titanocenes. Suitable co-initiators are preferably selected from a group comprising amine functional monomers, oligomers or polymers whereby amino functional monomers and oligomers are preferred. Both primary, secondary and tertiary amines can be used whereby tertiary amines are preferred. Suitable type II photoinitiators are commercially available, for example, as Esacure TZT from Lamberti Spa., Gallarate, Italy, or as 2- or 3-methylbenzophenone from Aldrich Co., Milwaukee, Wis.

Suitable amine co-initiators are commercially available, for example, as GENOMER 5275 from Rahn AG, Zürich, Switzerland.

The total amount of the one or more free-radical radiation polymerization initiators and, optionally, of one or more co-initiators typically is in the range of about 0.5 wt. % to about 10 wt. % and preferably in the range of about 1 wt. % to about 8 wt. % with respect to the mass of the precursor.

If desired, one or more monomers comprising one ethylenically unsaturated group and, optionally, further copolymerizable monomers may be added to the radiation-curable precursor prior to its application to the substrate in order to decrease the viscosity of the precursor and/or adjust the ratio of polymer obtained by the conversion of the monomers to polymer during the pre-polymerization of the mixture and the unreacted monomers, to the desired level. The radiation-curable precursor has a Brookfield viscosity of between 1,000 to 150,000 mPa·s, preferably of between 2,000 and 125,000 mPa·s, more preferably between 2,000 to 75,000 and especially preferably of between 2,000 and 50,000 mPa·s at 20° C.

If the radiation-curable precursor is applied to a substrate by printing it preferably has a Brookfield viscosity at 20° C. of between 1,000 and 30,000 mPa·s and more preferably between 2,000 and 25,000 mPa·s. Printable radiation-curable precursors are preferred.

The viscosity of the precursor can be adjusted by varying the degree of conversion of reactive monomers to polymer upon partial polymerization of the mixture to about 30-60 wt. % with respect to the initial mass of monomers prior to polymerization. The viscosity can be modified by including further components and additives into the precursor as is specified below.

It is also possible to include one or more monomers comprising two or more ethylenically unsaturated groups, into the radiation-curable precursor in order to increase the cohesive strength of the pressure-sensitive adhesive finally obtained. The amount of the monomers comprising one ethylenically unsaturated group or two or more ethylenically unsaturated groups, respectively, and optionally further reactive monomers, preferably is between 0-5 wt. % with respect to the mass of the radiation-curable precursor. The amount of monomers added to the radiation-curable precursor is preferably selected so that the ratio of the mass of the polymer obtained by the conversion of the monomers over the sum of the masses of such polymer and unreacted monomers in the radiation-curable precursor preferably is not less than 25 wt. % and more preferably not less than 30 wt. %.

Further components and additives may be included into the precursor such as, for example, polymers, defoaming agents, heat stabilizers, antioxidants, antistatic agents, thickeners, fillers, pigments, dyes, colorants, thixotropic agents, electrically conductive particles, thermally conductive particles, processing aides, nanoparticles, fibers and any combination thereof. Preferred additives include defoaming agents which can be included in an amount of between 0.01 and 10 wt. % and more preferably in an amount of between 0.05 and 5 wt. % with respect to the mass of the precursor in order to reduce the time required for defoaming the printed precursor.

The radiation-curable precursor of the present invention preferably includes one or more thermally activatable, non-encapsulated blowing agents and/or encapsulated thermally expandable microspheres.

Non-encapsulated blowing agents decompose upon heating thereby liberating a gas such as, for example, $N_2$, $CO$, $CO_2$, $H_2O$ or $NH_3$. Non-encapsulated blowing agents which are useful in the present invention include sodium bicarbonate, sodium carbonate, ammonium bicarbonate, ammonium carbonate, ammonium nitrite, N,N'-dimethyl-N,N'-dinitron terephthalamide, N,N'-dinitroso pentamethylene tetramine, azodicarbonamide, azobisisobutyronitrile, azocyclohexyl nitrile, azodiaminobenzene, barium azodicarboxylate, hydrazide compounds such as benzenesulfonylhydrazide, toluenesulfonylhyrazide, p,p'-oxybis(benzenesulfonyl hyrazide), diphenylsulfon-3,3'-disulfonylhydrazide, azide compounds such as calcium azide, 4,4'-diphenyldisulfonylazide, p-toluenesulfonylazide, and semicarbazide compounds such as p-toluene sulfonyl hydrazide.

Preferred blowing agents are azodicarbonamides which can optionally be modified with accelerators such as polyols, urea compounds, acylamines and/or organic zinc compounds such as Zn octoate. Azodicarbonamides and accelerator-modified azodicarbonamides typically exhibit a maximum blowing temperature where the gas is liberated at a maximum rate of between 150-200° C.

Further preferred blowing agents are hydrazide compounds which can optionally be modified with accelerators such as aliphatic alcohols, water or peroxides. Hydrazide compounds and accelerator-modified hydrazide compounds typically exhibit a maximum blowing temperature of between 100-160° C.

Further preferred blowing agents are semicarbazide compounds which can optionally be modified with accelerators such as urea compounds or organo zinc compounds such as, for example, Zn octoate. Semicarbazide compounds and accelerator-modified semicarbazides typically exhibit a maximum blowing temperature of between 180-230° C.

Thermally expandable microspheres comprise a flexible, thermoplastic polymeric shell and a core that includes a liquid and/or gas which expands upon heating. Preferably, the core material is an organic substance that has a lower boiling point than the softening temperature of the polymeric shell. Examples of suitable core materials include propane, butane, pentane, isobutane, neopentane, and combinations thereof.

The choice of thermoplastic resin for the polymeric shell influences the mechanical properties of the resulting foamed pressure-sensitive adhesive. Accordingly, the properties of the foamed pressure-sensitive adhesive may be adjusted through appropriate choice of expandable microspheres, or by using mixtures of different types of expandable microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foamed pressure-sensitive adhesives having higher tensile and cohesive strength than the pressure-sensitive adhesive alone, even though the foamed pressure-sensitive adhesive has a lower density than the pressure-sensitive adhesive. This provides the capability of preparing high strength, low density pressure-sensitive adhesive bonds.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres having essentially no vinylidene chloride units.

Expandable microspheres having a shell comprising acrylonitrile-resins and one or more hydrocarbons in the core, are preferred.

Examples of suitable commercially available expandable microspheres include Expancel® 820 DU 40, maximum expansion temperature about 115-125° C., density $\leq 25$ kg/m$^3$; Expancel® 461 DU 40, maximum expansion temperature about 137-145° C., density $\leq 20$ kg/m$^3$; Expancel® 091 DU 40, maximum expansion temperature about 183-193° C., density $\leq 14$ kg/m$^3$; and Expancel® 095 DU 120, maximum expansion temperature about 195-210° C., density $\leq 14$ kg/m$^3$. The Expancel® expandable microsphere specified are commercially available from Akzo Nobel, Sweden. Further examples of suitable commercially available expandable microspheres are available under the trade name Advancell-EM from Sekisui Chemical Comp. Ltd., Japan.

The radiation-curable precursor of the present invention may comprise between 0-50 wt. %, more preferably between 0-20 wt. % and especially preferably between 0-5 wt. %, of one or more non-encapsulated blowing agents and/or expandable microspheres. The amount of one or more non-encapsulated blowing agents and/or expandable microspheres is selected based on the desired properties of the resulting pressure-sensitive adhesive. Generally the higher the non-encapsulated blowing agent and/or expandable microsphere concentration, the lower the density of the resulting pressure-sensitive adhesive. The use of one or more non-encapsulated blowing agents and/or expandable microspheres is advantageous, for example, in case the pressure-sensitive adhesive layer bonds substrates with non-flat surfaces exhibiting gaps, scratches or other irregularities. The pressure-sensitive adhesive is pressed into such surface irregularities upon expansion of the blowing agents thereby improving the bonding between the substrates. The pressure-sensitive adhesive layer also expands at the edges of the bond between the substrates thereby sealing such edges.

Liberating of the blowing gas from the non-encapsulated blowing agents and/or expansion of the expandable microsphere may be effected partly or completely during radiation-curing of the radiation-curable precursor if, for example, high intensity radiation sources are used and/or blowing agents and/or expandable microspheres with a low maximum blowing temperature or a low maximum expansion temperature, respectively, are used. It is also possible to subject the cured pressure-sensitive adhesive to a thermal after-treatment to activate the non-encapsulated microspheres. Applying a thermal after-treatment usually is preferred.

Radiation-curable precursors comprising one or more expandable microspheres are preferred because the expansion of a layer of the radiation-curable precursor or the pressure-sensitive adhesive, respectively, tends to be more uniform and homogenous.

If the pressure-sensitive adhesive layer is applied to one substrate only the thickness of such layer increases when activating the blowing agents. In this case it is especially preferred to use encapsulated blowing agents which tend to result in an essentially uniform increase of the thickness of the adhesive layer.

Pressure-sensitive adhesive layers having a thickness of, for example, more than 300 μm and especially more than 500 μm and a foam-like structure obtained by expanding the blowing agents, are advantageous for high duty applications.

Another preferred additive includes fillers such as, for example, hydrophilic and/or hydrophobic fumed silica, respectively, or glass microspheres which may be added in an amount of between 0.1 and 10 wt. % and more preferably in an amount of between 0.5 and 5 wt. % with respect to the mass of the precursor in order to adjust the viscosity of the precursor.

The radiation-curable precursor of the present invention preferably is essentially solvent-free, i.e., it does essentially not comprise any inert solvents such as, for example, methanol, acetone, dimethylsulfoxide, tetrahydronaphthalene, silanes or toluene. It is, however, possible though not preferred that the precursor comprises small amounts of one or more of such inert solvents of preferably less than 5 wt. %, more preferably of less than 3 and especially preferably of 0-2.5 wt. % with respect to the mass of the precursor in order to improve the wetting of the substrates.

The amount of one or more potential further compounds and additives is selected so that it does not adversely affect the properties of the radiation-curable precursor such as, for example, its viscosity and/or the properties of the pressure-sensitive adhesive finally obtained. The amount of such further compounds and additives, if present, preferably is between 0 and 20 wt. % and more preferably between 0.1 and 15 wt. % with respect to the mass of the precursor.

If necessary, the radiation-curable precursor is thoroughly mixed and subsequently applied to a substrate in the fourth step (iv) of the invention.

Because of its low viscosity the precursor can be applied to a substrate by coating or printing. A wide variety of coating methods such as knife-coating, gravure coating, curtain coating, air knife coating and roll-coating can be used. If the viscosity of the precursor is between 1,000-30,000 mPa·s, the precursor can preferably be applied to a substrate by printing methods such as screen-printing, flexo-printing, gravure printing, offset printing or tampon printing. Screen-printing is preferred. The person skilled in the art can easily adjust the printing parameters such as, for example, the mesh size of the printing screen in case of screen-printing, in view of the viscosity value of a specific precursor. Printable precursors having a Brookfield viscosity at 20° C. of between 1,000-28,000 mPa·s and more preferably between 2,000-25,000 mPa·s are preferred.

The precursor can be applied to any substrate of any shape and surface structure. Suitable substrate materials include, without limitation, paper, textile, non-woven, polymer, wood or metallic materials. Due to its coatability or printability the precursor can preferably be used, for example, in the electronics industry where the shapes of the substrates to be adhered tend to get smaller and more complicated. If the precursor is used to provide pressure-sensitive adhesive tapes or pressure-sensitive adhesive films, the precursor is coated onto a backing, carrier web or release liner. For coating applications, the precursor preferably exhibits a Brookfield viscosity at 20° C. of between 1,000 and 100,000 mPa·s, more preferably of between 1,000-75,000 mPa·s and especially preferably of between 1,000-50,000 mPa·s.

Subsequent to its application to a substrate the precursor is further polymerized in step (v) by subjecting it to actinic irradiation and preferably to UV-irradiation.

Actinic radiation from any source and of any type can be used for the curing of the precursor of the present invention whereby light sources are preferred over e-beam sources. The light can be in the form of parallel rays or divergent beams. Since many photoinitiators generating free-radicals exhibit their absorption maximum in the ultraviolet (UV) range, the light source is preferably selected to emit an effective amount of such radiation. Suitable light sources include carbon arc lamps, mercury vapor lamps, fluorescent lamps comprising ultraviolet light-emitting phosphors, argon glow lamps and photographic flood lamps. Preferred are high-intensity light sources having a lamp power density of at least 80 mW/cm$^2$ and more preferably of at least 120 mW/cm$^2$.

When subjecting the precursor of the present invention to actinic irradiation and, in particular, to UV-irradiation, the precursor is cured via a free-radical polymerization mechanism. Above and below, the precursor of the present invention is termed as "fully cured" when the conversion of the monomers comprising one ethylenically unsaturated group and, optionally, of other copolymerizable monomers such as monomers comprising two or more ethylenically unsaturated groups, respectively, to polymer is at least 95%, more preferably at least 97.5%, especially preferably at least 98.5% and most preferably at least 99%.

Upon full curing, the precursor of the present invention is transformed into a pressure-sensitive adhesive.

It was surprisingly found that the precursors of the present invention can be cured in a non-inert, for example oxygen-containing atmosphere such as ambient atmosphere, without adversely affecting the properties of the resulting pressure-sensitive adhesive material to a degree relevant for any practical purposes. This is of considerably practical and economical importance since the application of the precursor is facilitated and not hampered by the need of maintaining an inert protection gas atmosphere.

Due to the high degree of conversion of the monomers to polymer of between 30-60 wt. % in the partially polymerized mixture, the precursor can be fully cured to a pressure-sensitive adhesive by applying low or relatively low energy densities (i.e., energy per surface area). While in Example 1 below a 50 μm thick layer of the acrylate-based precursor having a degree of conversion of reactive monomers to polymer of 42%, was fully cured by applying an energy density of 800 mJ/cm$^2$, a 50 μm thick layer of the precursor of Comparative Example 1 having a degree of conversion of reactive monomers to polymer of about 6%, required an energy density of about 2,000 mJ/cm$^2$ to provide full curing. The thermal energy introduced by high curing energy densities, may impart thermal damages to the precursor and/or the substrate and, in particular, to the surface area of the precursor or the resulting pressure-sensitive adhesive, respectively.

The energy density applied preferably is 600-1,000 mJ/cm$^2$ and more preferably 700-900 mJ/cm$^2$ for curing a 50 μm thick layer of the radiation-curable precursor.

The radiation-curable precursor obtainable by polymerizing an essentially solvent-free mixture comprising one or more free radically polymerizable monomers having one ethylenically unsaturated group and at least one free-radical polymerization initiator to a degree of conversion of monomers to polymer of between 30-60 wt. % with respect to the initial mass of the monomers, and adding one or more free-radical radiation polymerization initiators to such partially prepolymerized mixture, wherein said radiation-curable precursor exhibits a Brookfield viscosity at 20° C. of from 1,000 to 150,000 mPa·s, has advantageous properties and is also subject-matter of the present invention.

The radiation-curable precursor exhibits a high degree of conversion of monomers to polymer of between 30-60 wt. % with respect to the initial mass of monomers prior to polymerization and a coatable viscosity of between 1,000-150,000 mPa·s. It is speculated by the present inventors that this advantageous combination mainly results from a low polydispersity $\theta = M_w/M_n$ of the polymer obtained by partially polymerizing the mixture to a degree of between 30-60 wt. % with respect to the initial mass of the monomers prior to conversion. The polydispersity of the polymer preferably is between 2 and 3 and more preferably between 2 and 2.8. The polymer obtained by partially polymerizing the mixture disclosed in U.S. Pat. No. 4,181,752 comprising as a major portion thereof at least one acrylic acid ester of an alkyl alcohol containing from 4-14 carbon atoms, and at least one monomer copolymerizing therewith, according to the method disclosed in such reference, to a degree of conversion of monomers to polymer of up to about 10%, typically exhibits a monodispersity $M_w/M_n$ of about 10.

Due to its high degree of conversion and coatability, the radiation-curable precursor can advantageously be used for manufacturing, for example, pressure-sensitive adhesive tapes. The radiation-curable precursor can be coated or printed, respectively, to a backing or a release web. Because of the high degree of conversion of monomers to polymer, a relatively low energy density is sufficient to cure the precursor to the pressure-sensitive adhesive so that thermal damaging of the backing, the release web and/or the surface of the pressure-sensitive adhesive layer, respectively, can be safely avoided.

The precursor according to the present invention can be free radically cured in step (v) by actinic irradiation and especially preferably by UV-light irradiation by using different curing methods.

In a first method, which is also referred to as "two step" or "closed face" curing method, the precursor is applied, for example, to the surface of a first substrate and partially cured. To this effect, the dose of irradiation applied to the precursor is only part of the dose required to fully cure the precursor. The dose of the actinic irradiation and, more preferably, of the UV-irradiation during the initial partial curing step is preferably selected so as to provide a degree of conversion of the reactive monomers to polymer of between 50-80% and more preferably of between 60-80%. In this state, the partially cured precursor exhibits a macroscopic cold flow behaviour. The cold flow is measured by the method of measurement specified in the experimental section below. The dose of the initial irradiation is preferably selected so that the partially cured precursor exhibits a percentage change in the diameter of a sample of the radiation-curable precursor of at least 20%, preferably of at least 25% and especially preferably of at least 30% when measuring its flow resistance according to such method described in the test section below after a dwell time of 3 days at 23° C.

After the initial irradiation step, a second substrate is applied to the first substrate bearing the partially cured precursor, and the second substrate is preferably pressed into contact with the first one. Subsequently, the precursor is subjected to further actinic irradiation and/or, in particular, UV-irradiation to fully cure the precursor.

In the two-step or closed-face curing method described above, the precursor of the pressure-sensitive adhesive can alternatively also be applied onto the surfaces of both substrates.

In the closed-face curing method at least one of the substrates needs to be at least partially transparent for the actinic irradiation used for curing, that means, in particular, for UV-irradiation so that the partially cured precursor can be further cured after assembling the substrates together. The degree of transparency for actinic irradiation and, in particular, UV-irradiation depends on various parameters including the absorption coefficient of the respective material of the substrate, the thickness of the substrate and the spectral composition and intensity of the irradiation. The person skilled in the art will select these parameters and the material of at least one of the substrates so that the precursor is fully cured within less than 1 min, more preferably within less than 45 s and especially preferably within less than 30 s. It was observed that as a rule of thumb the intensity of the actinic irradiation and, in particular, the UV-irradiation after passing the at least partially transparent substrate, preferably is at least 50% and more preferably at least 60% with respect to the intensity of the impinging irradiation.

Suitable materials for use as a UV-transparent substrate include, for example, UV-transparent polymer materials such as polyolefins, polyesters (including polycarbonates), polyacrylates, polyurethanes and glass.

In the closed-face curing method of the present invention both type I photoinitiators or type II photoinitiators/co-initiator systems may be used, and it is also possible to use a combination of type I photoinitiators and type II photoinitiators/co-initiator systems. The use of type I photoinitiators is preferred.

The closed-face curing method of the present invention tends to provide high performance pressure-sensitive adhesive bonds which are characterized by high static shear values and by high T-peel values. It is speculated by the present inventors that these advantageous properties of the pressure-sensitive adhesive bond may be supported by the bonding mechanism where the substrates are assembled while the precursor is only partially cured and exhibits a macroscopic flow behaviour which results in good wet-out properties.

In a second method of curing the precursor of the present invention which is also referred to as "one step" or "open-face" curing method, the precursor is applied in a first step to the surface of a first substrate of an assembly and fully cured by subjecting it to actinic irradiation and preferably to UV-irradiation to provide a pressure-sensitive adhesive. In a second step, a second substrate may then be assembled to the exposed surface of the pressure-sensitive adhesive on the first substrate.

It was found by the present inventors that in the one-step or open-face curing method, the precursor preferably comprises at least one type I photoinitiator and at least one type II photoinitiator/co-initiator system.

Subsequent to fully curing the precursor as described above, the resulting pressure-sensitive adhesive may be subjected to a post-cure treatment in order to cross-link the pressure-sensitive adhesive or to increase its cross-link density, respectively. The post-cure treatment preferably includes, for example, e-beam curing or in case the pressure-sensitive adhesive comprises a latent thermal curative such as an aminoacrylate, by heating. A thermal after-treatment is also applied in order to activate blowing agents comprised in the pressure-sensitive adhesive as was described above.

The precursor of the present invention is especially suited for providing pressure-sensitive adhesive tapes and films which can be supported or unsupported, respectively.

Unsupported pressure-sensitive adhesive films which are also referred to as transfer tapes, can be obtained by coating the precursor on a release liner or release web with subsequent curing. When the transfer tape is used in the form of single sheets or stripes it is typically protected by two release liners while one release liner is usually sufficient when winding up the transfer tape to a roll. Suitable release liners are, for example, siliconized papers, siliconized polyesters, polyethylenes or polymer films treated with fluorochemicals; when using the unsupported film in form of a roll, the release liner preferably exhibits release properties on both sides with the backside typically exhibiting a lower adhesion than the front side.

Pressure-sensitive adhesive transfer films preferably exhibit a thickness of between 25-200 µm and more preferably between 30-200 µm.

The precursor of the present invention may also be applied to one or both major surfaces of a carrier layer or backing thus forming a single-coated or double-coated pressure-sensitive adhesive tape, respectively. It is also possible to apply the precursor of the present invention to one major surface of the carrier layer or backing only when a different pressure-sensitive adhesive layer is applied to the other major side of the backing.

The carrier layer or backing may be continuous or discontinuous and may be selected from a group of materials comprising polymeric films of various stiffness such as, for example, polyolefins, polyesters, polycarbonates or polymethacrylates, papers, non-wovens, fabrics, scrims, meshes, laminates (such as, for example, polyethylene or polyurethane foams laminated or jig-welded with polyethylene terephthalates), one part mechanical fasteners (which are described, for example, in U.S. Pat. No. 5,077,870) or metals. The thickness of the carrier layer typically varies between 25 and 3,000 µm, preferably between 25 and 1,000 µm. If desired, the carrier material may be treated with chemical primers or may be corona-treated in order to enhance bonding of the precursor and/or the resulting pressure-sensitive adhesive to the carrier material.

The thickness of the pressure-sensitive adhesive layers used in single-coated or double-coated adhesive tapes, respectively, preferably is between 10-250 µm and more preferably between 15-200 µm.

When storing the double-coated pressure-sensitive adhesive tapes, for example, in form of a roll or in form of sheets or stripes, these are typically protected on both sides of the film with release liners. The release liners discussed above for unsupported films can also be used for double-coated films. Single-coated pressure-sensitive adhesive tapes may be wound up to a roll without requiring a release liner if the exposed major surface of the carrier film exhibits sufficient release properties or is release-treated.

The pressure-sensitive adhesive obtained by the method of the present invention has advantageous properties such as a combination of advantageous values of shear and peel adhesion. The pressure-sensitive adhesive and the pressure-sensitive adhesive tapes prepared by the method of the present invention are novel and are subject matter of the present invention.

The adhesive and tapes of the invention can be used for applications such as bonding, joining, sealing, noise and vibration damping, insulating, mounting and the like.

The present invention will be further explained by the following examples which are intended to illustrate the invention without limiting it. First, however, certain procedures and tests used in the examples will be described. All percentages given are percentages by weight unless specified otherwise.

Materials Employed in the Examples and Comparative Examples

Multifunctional Monomer
Sartomer SR 502, ethoxylated (9) trimethylolpropanetriacrylate available from Cray Valley (Sartomer) Europe (Paris, France).

Photoinitiators
Esacure TZT
Type 2 photoinitiator, comprising 80 wt. % 2,4,6, trimethylbenzophenone and 20 wt. % benzophenone, available as Esacure TZT from Lamberti SPA (Gallarate, Italy)

Genomer 5275
Acrylated oligo amine resin, $M_W$=10,000, available as GENOMER 5275 from Rahn AG (Zurich, Switzerland); co-initiator for Esacure TZT.

Esacure KIP 100
Type 1 photoinitiator, comprising 70 wt. % poly[2, hydroxy-2-methyl-1-[4-(1-methylvinyl)phenyl]propan-1-one] and 30 wt. % 2, hydroxy-2-methyl-1-phenyl-propan-1-one, available as Esacure KIP 100 from Lamberti SPA (Gallarate, Italy)
IRGACURE™ 651, 2,2-dimethoxy-2-phenyl acetophenone, available from Ciba-Geigy.

Thermal Initiator
VAZO™ 52, (2,2'-azobis(2,4-dimethylpentanenitrile)) available from DuPont.

Additives
REGALREZ 6108 hydrogenated synthetic hydrocarbon resin, available from Eastman Chemicals (Middleburg, The Netherlands).
AEROSIL 200—hydrophilic fumed silica, available from Degussa AG (Duesseldorf, Germany).
Byk 057—silicone-free polymeric defoaming agent, available from BYK Chemie GmbH (Wesel, Germany).
Expancel 820 DU 40—expandable microspheres, non-expanded particle size 10-16 µm, maximum expansion temperature 115-125° C., density $\leqq 25$ kg/m³, available from Akzo Nobel, Sundsvall, Sweden.

Test Methods

I. For the Partially Polymerized Mixture

Viscosity (Brookfield)
Brookfield viscosity was measured at a temperature of 20° C. according to ASTM D4016-02 using a Brookfield Viscometer (model LV) and employing Spindle # 2 for viscosities in the range of 20,000-200,000 mPa·s, Spindle #3 for viscosities in the range of 20-20,000 mPa·s and Spindle # 4 for viscosities in the range of 100-10,000 mPa·s. Speeds of 6-600 rpm were employed.

Gel Permeation Chromatography (GPC)
Gel permeation chromatography was preformed using a Model 600E gel permeation chromatograph (available from Waters (Milford, Mass.) equipped with refractive index detectors (Type 410). Detector response was calibrated using polystyrene standards.

Tetrahyrofuran (THF) was used as a solvent and was passed through the 3 columns (mixed bed Type B filled with packing comprising 10 µm particles of polystyrene crosslinked with divinylbenzene), each column having a diameter of 7.5 mm and a length of 3 m) at a rate of 0.90 l/min. Column temperature was 40° C. Sample concentration was 0.25% by weight in THF.

Weight average molecular weight, $M_W$, and number average molecular weight, $M_n$, were calculated as well as the polydispersity, $\rho$, defined as $M_W/M_n$.

Monomer Conversion to Polymer
The extent of polymerization, or the amount of conversion of monomer to polymer was measured by one of two methods: gas chromatography (GC) or by a percent solids measurement. Two different GC methods were employed. One GC method was used when only isooctyl acrylate (IOA) was used as a monomer having one ethylenically unsaturated group, whereas a different GC method was used when both IOA and acrylic acid (AA) monomers were present in the mixture.

GC Measurement Method a1) IOA Only
A Hewlett-Packard Model 5890 gas chromatograph was used for measuring the weight percent of unreacted isooctyl acrylate with the following conditions:
Column—type: stainless steel
  Length: 12 foot (3.658 m)
  Inner diameter: ⅛ inch (0.3175 cm)
  Packing manufactured by Supelco Co. of Bellefonte, Pa. (liquid phase 20% SP2100, solid support 80/100 mesh Supelcoport)
Oven temperature—210° C. (Isothermal)
Detector—Thermal Conductivity (TCD)
Sensitivity setting: High Injector temperature—250° C.
Detector temperature—300° C.
Sample size—3 μl
Run time—5 min
Carrier gas—helium An internal standard solution containing the monomer (e.g., isooctyl acrylate) to be detected and a substance determined to have a similar detector response and a non-similar elution time, called the internal standard spiking compound (ISSC) is prepared in a vial. The concentration in the standard of the monomer being tested and that of the ISSC are both 1.00% by weight in a suitable solvent.

The standard is injected. The area under the analyte peak and under the ISSC peak in the time versus detector response plot of the chromatographic run of the standard are then measured. Calculations are then made to determine the relative detector response factors for the two compounds.

An aliquot of the sample of unknown residual monomer is diluted to 10% by weight with a suitable solvent to reduce the viscosity of the sample. The ISSC is added to the mixture in a weight equal to 5% of the weight of the sample before diluting with the solvent. The sample is injected.

The area under the analyte peak and under the ISSC peak in the time versus detector response plot of the chromatographic run of the diluted sample are then measured. Calculations are then made to determine the residual levels of the monomers in the sample using the measured areas and the relative response factors previously determined.

When designating the measured weight percent of unreacted isooctyl acrylate as $\beta$, the degree of conversion of monomers to polymer is $1-\beta$ (or, in case $\beta$ is reported in percent, $100\%-\beta$.

a2) IOA and AA

A Hewlett-Packard Model 5890 gas chromatograph was used for measuring the weight percent of unreacted isooctyl acrylate (IOA) and unreacted acrylic acid (AA) with the following conditions:
Column—type: capillary
  Length: 15 meter
  Inner diameter: 0.53 millimeter
  Liquid phase: HP-FFAP (manufactured by Hewlett-Packard)
  Film thickness: 3 micrometer
Split Flow—80 ml/min at 50° C.
Oven temperature program
  Initial temperature—50° C. Initial time—0.5 minutes

|  | Rate (° C./minute) | Final temperature (° C.) | Final time (minutes) |
|---|---|---|---|
| Level 1 | 20 | 100 | 0 |
| Level 2 | 30 | 250 | 2 |

Detector—flame ionization (FID)
Injector temperature—250° C.
Detector temperature—300° C.
Sample size—1 μl
Run time—5 min
Carrier gas—helium—10 ml/min at 50° C.

An aliquot of a sample of unknown residual monomer levels is diluted to 10% by weight with acetone to reduce the viscosity of the sample.

An external standard solution containing the residual monomers (e.g., isooctyl acrylate, acrylic acid) at known concentrations in acetone are prepared in a vial. The concentrations of the monomers in the standard are selected close to the expected concentrations of the monomers in the diluted sample of unknown residual monomers.

Equal volumes of the standard solution and the diluted sample are injected under identical conditions. The areas under the analyte peaks in the time versus detector response plot of the chromatographic run of the standard solution and of the diluted sample are then measured. Calculations are then made to determine the residual levels of the monomers in the sample.

When designating the measured weight percent of unreacted isooctyl acrylate as the degree of conversion of monomers to polymer is $1-\beta$.

a3) Other Reactive Monomers

The person skilled in the art can easily modify the test methods specified in sections a1) and a2) above to measure the degree of conversion of monomers to polymer for mixtures comprising reactive monomers other than IOA and AA.

Percent Solids Measurement Method Determined According to DIN 53216/ISO 3251 "Determination of Non-Volatile Content".

In case the mixture was prepared using only volatile monomers, the percent solids present in the partially polymerized mixture is equivalent to the percent conversion of the monomers to polymer in such mixture.

In cases where the mixture comprises a combination of volatile monomers with other non-volatile materials such as polymers, oligomers and/or inorganic fillers, for example, and/or with non-reactive volatile components such as solvents, the percent solids is not equivalent to the percent conversion of the monomers to polymer in such mixture.

Under these circumstances, the percent conversion by weight of the monomers to polymer in the partially polymerized mixture is obtained by measuring the percent solids per weight in such mixture as $\delta$.

If the initial mixture comprised monomers, non-reactive solids such as, for example, non-reactive polymers and non-reactive volatile additives such as, for example, solvents, the percent solids by weight as measured is $$\delta = \frac{m_o - m + m_s}{m_o + m_s + m_v}$$

wherein
$m_o$ is the initial mass of monomers prior to reaction
$m$ is the mass of monomers in the partially polymerized mixture
$m_s$ is the mass of the non-reactive solids and
$m_v$ is the mass of the non-reactive volatiles.

The degree of conversion $$\frac{m_0 - m}{m_0}$$

is obtained from the measured value $\delta$ of percent solids by weight as $$\frac{m_o - m}{m_o} = \frac{\delta(m_o + m_s + m_v) - m_s}{m_o}$$

The person skilled in the art can easily modify such calculation in case other volatile or non-volatile additives, respectively, are present in the initial mixture prior to polymerization.

Inherent Viscosity (I.V.)

Performed according to ASTM D2857/D4603 using a Canon-Fenske viscometer.

II. For the Radiation-Curable Precursor

Viscosity (Brookfield)

Brookfield viscosity was measured at a temperature of 20° C. according to ASTM D4016-02 using a Brookfield Viscometer (model LV) and employing Spindle # 2 for viscosities in the range of 20,000-200,000 mPa·s, Spindle #3 for viscosities in the range of 20-20,000 mPa·s and Spindle # 4 for viscosities in the range of 100-10,000 mPa·s. Speeds of 6-600 rpm were employed.

Flow Resistance of Partially Cured Radiation-curable Precursors

A 48-mm diameter circular coupon of a partially cured layer of a radiation-curable precursor of an adhesive covered by two release liners was placed onto a flat surface of a substrate.

A weight was placed on the partially cured radiation-curable adhesive for a specified length of time. Qualitatively, the flow of the partially cured radiation-curable precursor was determined by visual inspection. A weight of 500 g was employed for 3 days at 23° C.

Quantitatively, the flow of the partially cured radiation-curable precursor was measured as a change in the diameter of the sample. Results are reported as a percentage change in the diameter of said coupon.

III. For the Pressure-Sensitive Adhesive

Properties of the adhesives thus prepared were evaluated by standard test methods. Tests were conducted on two different main types of samples.

Part A. Tests for Sandwich Constructions

Adhesive precursor was prepared, coated and cured on polyester film to form a pressure-sensitive adhesive (PSA) tape. Tape was then laminated immediately to a second polyester film and allowed to rest at 23° C. for five days at 50% relative humidity before testing the strength of the adhesive bond.

T-peel Adhesion at 23° C.

The radiation-curable precursor of the pressure-sensitive adhesive was applied to a 175 μm thick polyester film using a knife coater to give a layer thickness of 50 μm and cured using UV-irradiation source available as Nanograph Ltd—UV Dryer, Type 90-0220-T8, available from Nanograph Ltd., Nothingham, United Kingdom, commonly employed for drying and curing of screen-printing inks. The polyester film, available as Melinex ST 726 from DuPont, was primed with an acrylate primer on both sides and used as received. The amount of energy incident on the layer of adhesive precursor was 800 mJ/cm² (unless otherwise indicated) as measured using a light measurement device commercially available as UVIMAP™ UM 365H S from Electronic Instrumentation and Technology (EIT) of Sterling, Va. The polyester film bearing the layer of the precursor of the pressure-sensitive adhesive was then passed under the UV-lamps at a line speed of 10 m/min. The sample residence time under the lamps was ca. 2 seconds which was sufficient to fully cure the precursor.

The layer of cured pressure-sensitive adhesive thus generated was then laminated immediately to an additional polyester film (Melinex ST 726 as above) so that the cured pressure-sensitive adhesive layer was between two layers of polyester forming a sandwich type construction. This construction was conditioned at 23° C. and 50% relative humidity for 5 days.

A T-peel adhesion test was then conducted according to Test Method ASTM (American Society for Testing and Materials) D1876-61T using a tensile tester at a jaw separation speed of 305 mm/min. The force required to separate the two polyester sheets was recorded in N/cm. The test was repeated three times and the results averaged.

T-peel Adhesion at 85° C.

This test was performed in a manner identical to that described for T-peel adhesion at 23° C., with the exception that the test was performed in a forced-air oven held at 85° C.

180° Peel Adhesion (23° C.)

The precursor of the pressure-sensitive adhesive was applied to a polyester film and fully cured as described under the test method T-Peel at 23° C. above. The adhesive tape thus prepared was laminated to a second polyester film to form a sandwich and condition at 23° C. and 50% relative humidity as described under T-peel at 23° C. above.

The polyester laminate to be tested was bonded on one side to an aluminium plate using double-coated pressure-sensitive adhesive tape.

Samples were then tested according to FINAT Test Method No. 1 (FINAT=Fédération International des Fabricants et Transformateurs d'Adhésifs et Thermocollants sur Papiers et autres Supports, The Hague, Netherlands). Results were recorded in N/cm. The test was repeated 3 times and the results averaged.

180° Peel at 85° C.

Test were conducted as above, with the exception that the test was performed in a forced air oven held at 85° C.

Static Shear (70° C.)

Test samples were prepared by lamination (using a 2 kg roller) so that two polyester strips were bonded to one another in an area of 2.54 cm (vertical)×1.27 cm (horizontal). A static shear test was performed after a conditioning time of 5 days according to FINAT Test Method 8 (1995).

The test was performed in a forced air oven held at 70° C. A load of 0.5 kg was applied to the adhesive tape immediately and the time to bond failure was recorded in minutes. The test was repeated and the two results were averaged.

Part B. Tests for Single-coated Adhesive Tapes

The radiation-curable precursor was prepared, coated and cured on a polyester film to form a single-coated PSA tape. The exposed adhesive surface was covered with a release liner and allowed to rest at 23° C. and 50% relative humidity for 1 week before testing. The liner was then removed and the tape was then adhered to a second substrate and the bond strength tested after a nominal dwell time of 24 hours.

90° Peel from Various Substrates

The radiation-curable precursor of the pressure-sensitive adhesive was applied to a polyester film and fully cured as described under the test method T-Peel at 23° C. above. The adhesive tape thus prepared was laminated to a specified substrate selected from:
a. Polypropylene (PP),
b. Acrylonitrile-butadiene-styrene (ABS), and
c. Stainless steel (SS).

Samples were tested after a dwell time of 24 hours according to FINAT Test Method No. 1 (FINAT=Fédération International des Fabricants et Transformateurs d'Adhésifs et Thermocollants sur Papiers et autres Supports, The Hague, Netherlands). Results were recorded in N/cm. The test was repeated 3 times and the results averaged.

Static Shear (23° C.)

Test samples were prepared by lamination (using a 2 kg roller) so that two polyester strips were bonded to one another in an area of 2.54 cm (vertical)×1.27 cm (horizontal). A static shear test was performed after a conditioning time of 5 days according to FINAT Test Method 8 (1995). The test was performed at 23° C. A load of 1.0 kg was applied to the adhesive tape immediately and the time to bond failure was recorded in minutes. The test was repeated and the two results were averaged.

EXAMPLES

Example 1

Preparation of a Partially Polymerized Mixture

The following components were charged to a 2-1 glass batch adiabatic reactor: 500 g isooctyl acrylate (IOA), 5.6 g acrylic acid (AA), 0.0043 g Vazo™ 52 (2,2'-azobis(2,4-dimethylpentanenitrile)) and, as a chain transfer agent, 0.90 g isooctyl thioglycolate (IOTG). The mixture was adiabatically polymerised as follows.

With the mixture held at 50° C., nitrogen was bubbled through the solution for 60 minutes to displace oxygen from the mixture and the reactor head space (volume of the reactor not occupied by the reaction mixture). The reactor was pressurized to about 2 psig or kPa with nitrogen and sealed. With the reactor's agitator turning at about 250 rpm, the temperature of the mixture was raised to 55° C. by temperature-controlled water circulating through the jacket on the reactor.

Once the polymerization had begun, the temperature control system was set to cause the temperature in the water circulating through the jacket to track 5° C. above the batch temperature to facilitate adiabatic reaction conditions.

About 3 minutes into the reaction, as a final oxygen purge, the reactor pressure was vented, and then re-pressurized with nitrogen.

After about 5 minutes into the reaction, the batch temperature reached about 95° C. and the jacket control system was unable to keep pace with the rate of batch temperature rise. At this point the jacket was drained and the reaction temperature kept climbing. Five minutes later, the reaction temperature peaked at 120° C. at which time cooling was applied to the jacket of the reactor.

A sample was taken of the reaction mixture. The inherent viscosity (I.V.) of the polymer was 0.36 dl/g and the solids was 42 wt. %. Brookfield viscosity of the partially polymerized mixture was 4,000 mPa·s. Molecular weight characterization was performed by gel permeation chromatography (GPC) as described above under Test Methods. Weight average molecular weight ($M_w$) was recorded as well as the polydispersity (ρ or $M_w/M_n$). This partially polymerized mixture is referred to as Adiabatic Syrup 1 (AS-1) in the following tables. Chemical composition and properties of partially polymerized mixtures (=Adiabatic Syrups) employed in the examples and comparative examples are summarized in Table 1 below.

Preparation of a Radiation-curable Precursor

Adiabatic Syrup 1 (referred to hereafter as "AS-1", 100 parts by weight) prepared by the method just described was combined with the following components:

a. 1 part by weight Esacure TZT, Type 2 photoinitiator, comprising 80 wt. % 2,4,6, trimethylbenzophenone and 20 wt. % benzophenone, available as Esacure TZT from Lamberti SPA (Gallarate, Italy);

b. 2 parts by weight GENOMER 5275, Acrylated oligo amine resin, $M_w$=10,000, available as GENOMER 5275 from Rahn AG (Zurich, Switzerland); co-initiator for Esacure TZT;

c. 4 parts by weight Esacure KIP 100, Type 1 photoinitiator, comprising 70 wt. % poly[2, hydroxy-2-methyl-1-[4-(1-methylvinyl)phenyl]propan-1-one] and 30 wt. % 2, hydroxy-2-methyl-1-phenyl-propan-1-one, available as Esacure KIP 100 from Lamberti SPA (Gallarate, Italy); and d. 1.5 parts by weight SARTOMER SR 502, ethoxylated (9) trimethylolpropane triacrylate and mixed for ca. 10 minutes. The Brookfield viscosity of the radiation-curable precursor was 13,000 mPa·s. Chemical composition and viscosity of the radiation-curable precursor are summarized in Table 2 below.

Coating and Curing of the Radiation-curable Precursor

The radiation-curable precursor was applied to a 175 μm thick polyester film (available as Melinex ST 726 from DuPont, primed with an acrylate primer on both sides) using a knife coater to give a layer thickness of 50 μm.

The radiation-curable precursor was then cured using UV-irradiation source available as Nanograph Ltd—UV Dryer, Type 90-0220-T8, available from Nanograph Ltd., Nothingham, United Kingdom, commonly employed for drying and curing of screen-printing inks. The polyester film bearing the layer of the precursor of the pressure-sensitive adhesive was then passed under the UV-lamps described above at a line speed of 10 m/min. The sample residence time under the lamps was ca. 2 seconds which was sufficient to fully cure the precursor. The amount of energy incident on the layer of adhesive precursor was 800 mJ/cm$^2$ (unless otherwise indicated) as measured using a light measurement device commercially available as UVIMAP™ UM 365H S from Electronic Instrumentation and Technology (EIT) of Sterling, Va.

Testing of the Properties of the Cured Pressure-sensitive Adhesive

Example 1 was tested as a sandwich construction prepared as described in Test Methods for pressure-sensitive adhesives PART A. A polyester sandwich of the pressure-sensitive adhesive of Example 1 was tested for T-peel adhesion at both 23° C. and 85° C., static shear at 70° C., and 180° peel adhesion at both 23° C. and 85° C. Pressure-sensitive adhesive test results are summarized in Table 3.

Test results show good pressure-sensitive adhesive performance at ambient conditions with relatively low performance at elevated temperatures (85° C.).

Examples 2-3

Examples 2 and 3 were prepared in the same manner as Example 1, with the exception that the amount of isooctyl thioglycolate (IOTG, a chain transfer agent) employed in preparation of the partially polymerized mixture referred to as Adiabatic Syrups AS-2 and AS-3, respectively, was decreased so as to increase the molecular weight of the polymer formed. Change in the molecular weight of the polymer of adiabatic syrups can be followed in Table 1.

The Adiabatic Syrups AS-2 and AS-3, respectively, were mixed with photoinitiators of the kind and amount described in Example 1 to form a radiation-curable precursor. The resulting precursors were coated and cured in the same manner as Example 1 to give pressure sensitive adhesives.

Results of adhesive tests are summarized in Table 3. Examples 2 and 3 demonstrate much improved high temperature performance compared to Example 1.

Examples 4-6

Examples 4-6 were prepared essentially in the same manner as Example 1, with the exception that reaction components for preparation of the Adiabatic Syrups were selected so as the keep the molecular weight relatively constant and allow the percent solids to increase. This was accomplished by increasing the amount of initiator. Increase in percent solids for Adiabatic Syrups AS-4, AS-5 and AS-6 can be followed in Table 1.

The Adiabatic Syrups thus prepared were mixed with the same photoinitiators in the same amounts as in Example 1 and coated and cured under the same conditions.

Single-coated pressure-sensitive adhesive tapes were adhered to a second layer of Melinex ST 726 polyester film to give sandwich constructions that were tested after five days according to the procedures listed under PART A on the Test Methods for pressure-sensitive adhesives above. Results of adhesive tests are summarized in Table 3.

Test results show very good high temperature peel adhesion values, especially for materials with an inherent viscosity (I. V.) of greater than 0.4 and a solids content of greater than 31%.

TABLE 1

Composition and properties of partially polymerized mixtures (adiabatic syrups) obtained in step (ii)

| Adiabatic Syrups | IOA, wt. % | AA, wt. % | IOTG, wt. % | Vazo™ 52, wt. % | I.V. | $M_w$ ($10^3$) | Polydispers., ρ | wt. % solids | Viscosity, mPa · s |
|---|---|---|---|---|---|---|---|---|---|
| AS-1 | 90 | 10 | 0.178 | 0.0008 | 0.36 | 170.7 | 2.1  | 42 | 4,000 |
| AS-2 | 90 | 10 | 0.060 | 0.0008 | 0.57 | 323.2 | 2.29 | 42 | 12,000 |
| AS-3 | 90 | 10 | 0.041 | 0.0008 | 0.75 | 482.7 | 3.41 | 44 | 61,000 |
| AS-4 | 90 | 10 | 0.081 | 0.0004 | 0.52 | 283.1 | 2.11 | 31 | 4,300 |
| AS-5 | 90 | 10 | 0.081 | 0.0008 | 0.50 | 268.2 | 2.13 | 46 | 13,500 |
| AS-6 | 90 | 10 | 0.081 | 0.0016 | 0.48 | 273.9 | 2.29 | 59 | 100,000 |

In Table 1, the wt. % for IOA and AA refer to the sum of masses of the monomers and add up to 100% whereas the wt. % for IOTG and Vazo 52 refer to the mass of the mixture.

TABLE 2

Composition of radiation-curable precursors obtained in step (iii)

| Example | Adiabatic Syrup, parts | Sartomer SR 502, parts | Esacure TZT, parts | Esacure KIP 100, parts | Genomer 5275, parts | Viscosity, mPa · s |
|---|---|---|---|---|---|---|
| 1 | AS-1, 100 | 1.5 | 1 | 4 | 2 | 5,600 |
| 2 | AS-2, 100 | 1.5 | 1 | 4 | 2 | 19,800 |
| 3 | AS-3, 100 | 1.5 | 1 | 4 | 2 | 72,000 |
| 4 | AS-4, 100 | 1.5 | 1 | 4 | 2 | 5,500 |
| 5 | AS-5, 100 | 1.5 | 1 | 4 | 2 | 21,000 |
| 6 | AS-6, 100 | 1.5 | 1 | 4 | 2 | 112,000 |

TABLE 3

Properties of cured pressure-sensitive adhesives - sandwich constructions

| Example | T-peel adh., (23° C.), N/cm | T-peel adh., (85° C.), N/cm | Static shear (70° C.), min | 180° Peel adh. (23° C.), N/cm | 180° Peel adh. (85° C.), N/cm |
|---|---|---|---|---|---|
| 1 | 5.0 | 0.6  | >10,000 | 15.6 | 0.8 |
| 2 | 5.0 | 1.6  | >10,000 | 14.8 | 2.6 |
| 3 | 5.7 | 2.1  | >10,000 | 15.7 | 8.4 |
| 4 | 4.5 | 0.7  | 90      | 13.3 | 3.0 |
| 5 | 5.5 | 1.6  | >10,000 | 16.6 | 3.6 |
| 6 | 4.1 | 0.95 | >10,000 | 17.6 | 3.9 |

Examples 7-13

Examples 7-13 show how coating compositions can be prepared with varying amounts of acrylic acid (AA) (Examples 7-11) and including a third acrylic monomer isobornylacrylate (IBOA) (Examples 12-13). The chemical compositions and properties of the corresponding Adiabatic Syrups AS-7 through AS-13 are summarized in Table 4.

Adiabatic syrups were prepared and then compounded with photoinitiators to form radiation-curable precursors. In these examples, the Adiabatic Syrups were compounded with:

a. 1 part by weight Esacure TZT, Type 2 photoinitiator, comprising 80 wt. % 2,4,6, trimethylbenzophenone and 20 wt. % benzophenone, available as Esacure TZT from Lamberti SPA (Gallarate, Italy);

b. 4 parts by weight Esacure KIP 100, Type 1 photoinitiator, comprising 70 wt. % poly[2, hydroxy-2-methyl-1-[4-(1-methylvinyl)phenyl]propan-1-one] and 30 wt. % 2, hydroxy-2-methyl-1-phenyl-propan-1-one, available as Esacure KIP 100 from Lamberti SPA (Gallarate, Italy); and c. 1.5 parts by weight SARTOMER SR 502, ethoxylated (9) trimethylolpropane triacrylate.

The GENOMER material, a difunctional amine oligomer, employed in the amount of 2 parts in Examples 1-6 was omitted. The difunctional amine oligomer is known to promote continued crosslinking with time. The resulting adhesive precursor prepared without the difunctional amine oligomer was therefore more suitable for preparing a pressure-sensitive adhesive that was intended to have stable pressure-sensitive properties over an extended period of time. Chemical composition of the radiation-curable precursors is summarized in Table 5.

These radiation-curable precursors were coated and cured by the same method as employed in Example 1.

Resulting pressure-sensitive adhesive tapes were then tested as single-sided pressure-sensitive adhesive tapes according to PART B of the Test Methods for pressure-sensitive adhesives above. Tests performed include 90° peel adhesion from three substrates at 23° C. (stainless steel, ABS and polypropylene). A static shear test at 23° was also performed.

Results of the tests on the cured pressure-sensitive adhesives are summarized in Table 6 and show that materials comprising isobornyl acrylate (IBA) are suitable for use on low surface energy polymeric materials such as polypropylene (PP) and acrylonitrile butadiene styrene terpolymers (ABS), for example.

TABLE 5

Composition of radiation-curable precursors

| Example | Adiabatic Syrup, parts | Sartomer SR 502, parts | Esacure TZT, parts | Esacure KIP 100, parts | Viscosity, mPa · s |
|---|---|---|---|---|---|
| 7 | AS-7 | 1.5 | 1 | 4 | 3,000 |
| 8 | AS-8 | 1.5 | 1 | 4 | 3,600 |
| 9 | AS-9 | 1.5 | 1 | 4 | 4,050 |
| 10 | AS-10 | 1.5 | 1 | 4 | 9,700 |
| 11 | AS-11 | 1.5 | 1 | 4 | 32,000 |
| 12 | AS-12 | 1.5 | 1 | 4 | 10,500 |
| 13 | AS-13 | 1.5 | 1 | 4 | 8,200 |

TABLE 6

Properties of pressure-sensitive adhesives (single-coated tapes)

| Example | 90° peel adhesion (SS), 23° C., N/cm | 90° peel adhesion (ABS), 23° C., N/cm | 90° peel adhesion (PP), 23° C., N/cm | Static shear, 23° C., min |
|---|---|---|---|---|
| 7 | 0.5 | 0.6 | 0.51 | 0.1 |
| 8 | 2.6 | 2.8 | 2.1 | 0.4 |
| 9 | 3.2 | 3.8 | 1.4 | 12 |
| 10 | 2.9 | 2.6 | 0.6 | 124 |
| 11 | 4.6 | 2.0 | 0.15 | >10,000 |
| 12 | 4.1 | 4.5 | 1.96 | 6 |
| 13 | 4.2 | 4.2 | 0.31 | 800 |
| 15 | 9.7 | 4.8 | 0.5 | 5,000 |

Example 14

The radiation-curable precursor of Example 5 was first compounded with 3.5 parts AEROSIL 200, a hydrophilic fumed silica available from Degussa AG, (Duesseldorf, Germany), and 0.75 parts by weight Byk 057, a silicone-free polymeric defoaming agent, available from BYK Chemie GmbH (Wesel, Germany). Both amounts are in addition to the components of Example 5 and are based on 100 parts by weight of Adiabatic Syrup AS-5.

Byk 057 was added to prevent foaming of the adhesive precursor on the screen and AEROSIL 250 was added to provide suitable increased viscosity for screen printing. The adhesive precursor was then employed with a flat-bed printing machine type 10-20 available from Thieme GmbH & Co KG (Teningen, Germany) employing a flat 100 mesh screen.

A flat and continuous coating of radiation-curable precursor having a wet thickness of 45-50 μm was applied to a polyester sheet (Melinex™ ST 726).

TABLE 4

Composition and properties of partially cured mixtures (Adiabatic Syrups)

| Adiabatic Syrups | IOA, wt. % | AA, wt. % | IBOA, wt. % | IOTG, wt. % | Vazo™ 52, wt. % | I.V. | $M_w$ ($10^3$) | Polydisp., ρ | wt. % solids | Viscosity, mPa · s |
|---|---|---|---|---|---|---|---|---|---|---|
| AS-7 | 100 | 0 | 0 | 0.081 | 0.0008 | 0.40 | 256 | 2.6 | 42 | 3,100 |
| AS-8 | 97.5 | 2.5 | 0 | 0.081 | 0.0008 | 0.44 | 251 | 2.27 | 45 | 3,800 |
| AS-9 | 95.0 | 5.0 | 0 | 0.081 | 0.0008 | 0.45 | 248 | 2.32 | 42 | 4,100 |
| AS-10 | 92.5 | 7.5 | 0 | 0.081 | 0.0008 | 0.49 | 260 | 2.43 | 46 | 9,800 |
| AS-11 | 87.5 | 12.5 | 0 | 0.081 | 0.0008 | 0.48 | 275 | 2.38 | 46 | 32,000 |
| AS-12 | 82.6 | 0.75 | 16.65 | 0.081 | 0.0016 | 0.41 | 245 | 2.11 | 54 | 11,000 |
| AS-13 | 69.0 | 3.0 | 28.0 | 0.081 | 0.0016 | 0.40 | 206 | 2.21 | 55 | 8,500 |

In Table 4, the wt. % for IOA, AA and IBOA refer to the sum of masses of the monomers and add up to 100% whereas the wt. % for IOTG and Vazo 52 refer to the mass of the mixture.

The layer of radiation-curable precursor was cured using a UV-dryer available as Type 90-0220-T8 from Nanograph Ltd (Nothingham, United Kingdom). Both lamps were employed at full power. Light exposure was adjusted to 800 mJ/cm$^2$ using a UVIMAP™ light measuring device light measurement device commercially available as UVIMAP™ UM 365H S from Electronic Instrumentation and Technology (EIT) of Sterling, Va. The speed of the web passing through the dryer was 9.5 m/min.

Example 15

One hundred (100) parts of Adiabatic Syrup AS-13 was combined with 1.5 parts SR502, 1 part TZT, 4 parts KIP100 and 24 parts by weight Regalrez™ 6108, a hydrogenated synthetic hydrocarbon resin available from Eastman Chemicals (Middleburg, The Netherlands). This composition was mixed until homogeneous. The adhesive precursor thus prepared had a viscosity of 11,200 mPa·s. The adhesive was coated and cured as in Example 1.

Properties of the pressure-sensitive adhesive were tested according to PART B of Test Methods for the radiation-curable precursor. Test results are summarized in Table 6.

Example 16

The adhesive precursor of Example 11 (100 parts by weight) was mixed with 5 parts by weight of expandable polymeric microspheres, available commercially as EXPANCEL 820 DU 40 from Akzo-Nobel. The precursor was then coated at a thickness of 100 μm and cured as in Example 11.

After UV-curing, the adhesive layer was then heated at 130° C. for 4 minutes resulting in a increase in thickness of the cured adhesive mass to ca. 300 μm.

The tape was then used to bond two substrates together.

Comparative Example 1

Preparation of a Partially Polymerized Mixture (Acrylic Syrup P1)

A polymer/monomer syrup was prepared by partial polymerization of a solvent-free monomer mixture by the following method.

Isooctyl acrylate and acrylic acid were combined in the weight ratio of 89 parts to 11 parts by weight and subjected to UV-initiated polymerization using 0.1 wt. % Irgacure™ 651 photoinitiator in the absence of oxygen. The reaction was stopped by switching of the UV-lamps used for initiation and introduction of oxygen at a conversion of ca. 6 wt. %. This partially polymerized polymer/monomer mixture thus prepared had an inherent viscosity (I.V.) of 3.1 and a Brookfield viscosity of 6,000 mPa·s. This material is referred to as P1 in the tables below.

Preparation of the Radiation-Curable Precursor

One hundred parts by weight of the syrup prepared as described above (P1) was combined with UV-initiators of the kind and amount as in Example 1:

a. 1 part by weight Esacure TZT, Type 2 photoinitiator, comprising 80 wt. % 2,4,6, trimethylbenzophenone and 20 wt. % benzophenone, available as Esacure TZT from Lamberti SPA (Gallarate, Italy);

b. 2 parts by weight GENOMER 5275, Acrylated oligo amine resin, $M_w$=10,000, available as GENOMER 5275 from Rahn AG (Zurich, Switzerland); co-initiator for Esacure TZT;

c. 4 parts by weight Esacure KIP 100, Type 1 photoinitiator, comprising 70 wt. % poly[2, hydroxy-2-methyl-1-[4-(1-methylvinyl)phenyl]propan-1-one] and 30 wt. % 2, hydroxy-2-methyl-1-phenyl-propan-1-one, available as Esacure KIP 100 from Lamberti SPA (Gallarate, Italy); and d. 1.5 parts by weight SARTOMER SR 502, ethoxylated (9) trimethylolpropane triacrylate.

GENOMER difunctional amine oligomer was included at a level of 2 parts as these materials are intended to undergo further crosslinking after an adhesive bond has been made.

Curing the Radiation-curable Precursor

The radiation-curable precursor was coated and cured by the method of Example 1, specifically using 800 mJ/cm$^2$ of curing energy. The result was an incompletely cured adhesive layer having no cohesive strength.

The layer of radiation-curable precursor could be cured more completely by increasing the amount of radiation from 800 mJ/cm$^2$ to 2000 mJ/cm$^2$. The amount of radiation the radiation-curable precursor received was increased by increasing the time of exposure to the UV-lamps. The curing of the radiation-curable precursor using 2000 mJ/cm$^2$ required about 6 seconds, a curing time that is very impractical for converters and users requiring efficient creation of cured pressure-sensitive adhesive materials from coatable precursors. Such long residence time also causes high generation of heat that can burn the coated substrate.

In particular, it was observed that the surface of the adhesive was overcured and that the curing throughout the adhesive layer was non-uniform when attempts were made to cure the adhesive with longer exposures.

The resulting inhomogeneously cured adhesive was tested according to PART B of the Test Methods for pressure-sensitive adhesives, especially for sandwich constructions.

Results show that, first, 2000 mJ/cm$^2$ was required to reasonably cure the adhesive precursor. This resulted in an overcured pressure-sensitive adhesive surface providing poor T-peel performance at 85° C.

Comparative Example 2

Preparation of a Partially Polymerized Mixture (Acrylic Syrup, P2)

A completely polymerized acrylic pressure-sensitive adhesive polymer was prepared by polymerization in solvent according to the following procedure. A mixture of 90 g isooctyl acrylate (IOA), 10 g acrylic acid (AA), 43.2 g 1-methoxypropanol-2 (Solvenon™ PM 64) and 8 g heptane were combined with 0.200 g 2,2'-azobis(2,4-dimethylvaleronitrile (available as VAZO 52 from DuPont). The mixture was polymerized in inert atmosphere for 16 hours in a water bath held at 45° C. The resulting pressure-sensitive adhesive was completely polymerized (>99 wt. % conversion to polymer) and had a solids content of ca. 45 wt. %. The resulting polymer had an inherent viscosity (I.V.) of 0.46. The solvent was removed by vacuum distillation at 120° C. to give a solids content of 99.5 wt. %.

Fifty parts by weight of this pressure-sensitive adhesive was then combined with fifty parts by weight of a mixture of isooctyl acrylate (IOA) and acrylic acid (AA) (in a weight ratio of 90 to 10 parts by weight) to form a polymer/monomer syrup having a solids content of 50 wt. %.

This syrup-type material, referred to hereafter as P2, was then combined with:

a. 1 part by weight Esacure TZT, Type 2 photoinitiator, comprising 80 wt. % 2,4,6, trimethylbenzophenone and 20 wt. % benzophenone, available as Esacure TZT from Lamberti SPA (Gallarate, Italy);
b. 2 parts by weight GENOMER 5275, Acrylated oligo amine resin, $M_w$=10,000, available as GENOMER 5275 from Rahn AG (Zurich, Switzerland); co-initiator for Esacure TZT;
c. 4 parts by weight Esacure KIP 100, Type 1 photoinitiator, comprising 70 wt. % poly[2, hydroxy-2-methyl-1-[4-(1-methylvinyl)phenyl]propan-1-one] and 30 wt. % 2, hydroxy-2-methyl-1-phenyl-propan-1-one, available as Esacure KIP 100 from Lamberti SPA (Gallarate, Italy); and
d. 1.5 parts by weight SARTOMER SR 502, ethoxylated (9) trimethylolpropane triacrylate as in Comparative Example 1.

The adhesive precursor thus prepared was subjected to the same curing conditions used to polymerize the radiation-curable precursors of the present invention. The pressure-sensitive adhesives were then tested by the same procedures as Comparative Example 1. Significantly, the static shear behaviour resulted in cohesive failure of the adhesive.

Comparative Examples 3 and 4

Adiabatic syrups employed in Comparative Examples 1 and 2, respectively, were compounded in a slightly different manner to give precursors more suitable for making single sided adhesive tapes. In these example the amount of GENOMER was reduced to 0.5 parts by weight to suppress extensive crosslinking after curing.

Properties of the pressure-sensitive adhesives are shown in Table 10. These materials are also inferior to those of the present invention. Specifically, Comparative Example 3 again had an overcured surface comparable to Comparative Example 1 and had low peel strength. Comparative Example 4 showed that some low performance adhesive properties can be obtained. In general, however, both Comparative Examples 2 and 4, employing the syrup referred to as P2, are complicated and impractical to prepare due to the complex multistep process for making the polymer/monomer syrup.

TABLE 7

Compositions of partially polymerized mixtures (syrups) of the comparative examples

| Example | IOA, wt. % | AA, wt. % | I.V. | $M_w$ (10³) | Polydisp., ρ | Viscos., mPa·s | wt. % solids |
|---|---|---|---|---|---|---|---|
| P1 | 89 | 11 | 3.1 | 2,510 | 4.51 | 6,000 | 6 |
| P2 | 90 | 10 | 0.46 | 255 | 2.51 | 14,500 | 50 |

TABLE 8

Compositions of radiation-curable precursors of the comparative examples

| Example | Syrup, parts by weight | SR 502 pbw | TZT pbw | KIP 100 pbw | Genomer 5275 pbw | Visc. (Brookfield), mPa·s |
|---|---|---|---|---|---|---|
| C1 | P1, 100 | 1.5 | 1 | 4 | 2 | 7,200 |
| C2 | P2, 100 | 1.5 | 1 | 4 | 2 | — |
| C3 | P1, 100 | 1.5 | 1 | 4 | 0.5 | 6,300 |
| C4 | P2, 100 | 1.5 | 1 | 4 | 0.5 | — |

TABLE 9

Properties of cured adhesive (tested as sandwich constructions)

| Example | Curing energy density, mJ/cm² | T-peel, 23° C., N/cm | T-peel 85° C., N/cm | 180° peel adhesion, 23° C., N/cm | 180° peel adhesion, 85° C., N/cm | Static shear, 70° C., min |
|---|---|---|---|---|---|---|
| C1 | 2,000 | 1.1 | 0.28 | 2.8 | 0.15 | >10,000 |
| C2 | 800 | 1.8 | 0.15 | 15.0 | 1.6 | 400 (co) | co = cohesive failure (splitting of the adhesive layer)

TABLE 10

Properties of cured pressure-sensitive adhesive (tested as single-sided tapes)

| Example | Curing energy density, mJ/cm² | 90° peel adhesion, SS, N/cm | 90° peel adhesion, ABS, N/cm | Static shear, 23° C., min |
|---|---|---|---|---|
| C3 | 2,000 | 0.8 | 1.0 | >10,000 |
| C4 | 800 | 2.1 | 1.8 | 158 |

The invention claimed is:

1. Method of preparing a pressure-sensitive adhesive comprising the steps of:
   (i) providing an essentially solvent-free mixture comprising one or more free radically polymerizable monomers having one ethylenically unsaturated group and at least one free-radical polymerization initiator, wherein the essentially solvent-free mixture comprises less than about 20 weight percent solvent,
   (ii) partially polymerizing said mixture to provide a partially polymerized mixture exhibiting a Brookfield viscosity of between 1,000 and 125,000 mPa·s at 20° C. and a degree of conversion of monomers to polymer of between 30-60 wt. % with respect to the initial mass of the monomers prior to polymerization,
   (iii) adding one or more free-radical radiation polymerization initiators to the partially polymerized mixture to provide a radiation-curable precursor,
   (iv) applying the radiation-curable precursor to a substrate, and
   (v) further polymerizing the radiation-curable precursor by subjecting it to actinic irradiation to provide said pressure-sensitive adhesive, wherein the radiation-curable precursor is in a non-inert atmosphere while being subjected to the actinic radiation.

2. Method according to claim 1 wherein the partial polymerization of the mixture is performed under essentially adiabatic polymerization conditions.

3. Method according to claim 1 wherein the radiation-curable precursor exhibits a Brookfield viscosity at 20° C. of from 1,000 to 150,000 mPa·s.

4. Method according to claim 1 wherein the one or more free-radical polymerization initiators are thermally activatable polymerization initiators.

5. Method according to claim 4 where the one or more thermally activatable free-radical polymerization initiators are selected from a group consisting of organic peroxides, organic hydro peroxides and azo-group containing compounds.

6. Method according to claim 1 where the one or more free-radical polymerization initiators are present in an amount of between 0.0005-0.5 wt. % with respect to the mass of the one or more monomers.

7. Method according to claim 1 wherein the one or more free-radical radiation polymerization initiators are selected from a group consisting of type I and type II photoinitiators.

8. Method according to claim 1 wherein the one or more free-radical radiation polymerization initiators are present in an amount of between 0.25-10 wt. % with respect to the mass of the radiation-curable precursor.

9. Method according to claim 1 wherein the polymer in the partially polymerized mixture obtained by conversion of monomers to polymer is characterized by a polydispersity $M_w/M_n$ of between 2 and 3.

10. Method according to claim 1 wherein the polymer in the radiation-curable precursor obtained by conversion of monomers to polymer is characterized by a polydispersity $M_w/M_n$ of between 2 and 3.

11. Method according to claim 1 wherein the radiation-curable precursor comprises one or more heat-activatable blowing agents.

12. Method according to claim 1 wherein upon further polymerization of the radiation-curable precursor at least 95% of the monomers have been converted to polymer.

13. Method according to claim 1 where the substrate is selected from a group consisting of paper, textile, non-woven, polymer, metal or wood substrates.

14. Method according to claim 1 where the mixture is applied to the substrate by coating or printing.

15. Method according to claim 1, wherein the radiation-curable precursor comprises less than 5 weight percent inert solvents.

* * * * *

UNITED STATES PATENT AND TRADEMARK OFFICE
CERTIFICATE OF CORRECTION

| | |
|---|---|
| PATENT NO. | : 7,691,437 B2 |
| APPLICATION NO. | : 10/698201 |
| DATED | : April 6, 2010 |
| INVENTOR(S) | : Mark F Ellis et al. |

It is certified that error appears in the above-identified patent and that said Letters Patent is hereby corrected as shown below:

Column 3
Lines 33-34, Delete "polyethylenglycol" and insert -- polyethyleneglycol --, therefor.

Column 5
Line 22, After "system" insert -- . --.

Column 8
Line 51, Delete "t-dodecylemercaptan," and insert -- t-dodecylmercaptan, --, therefor.

Column 12
Line 53, Delete "toluenesulfonylhyrazide," and insert -- toluenesulfonylhydrazide, --, therefor.
Line 54, Delete "hyrazide)," and insert -- hydrazide), --, therefor.

Column 19
Line 50, After "Italy)" insert -- . --.
Line 61, After "Italy)" insert -- . --.

Column 20
Line 32, Delete "Tetrahyrofuran" and insert -- Tetrahydrofuran --, therefor.

Column 21
Line 5, After "helium" insert -- . --.
Line 32, Delete "β." and insert -- β). --, therefor.

Column 23
Line 53, Delete "Nothingham," and insert -- Nottingham, --, therefor.

Column 26
Lines 32-33, Delete "Nothingham," and insert -- Nottingham, --, therefor.

Signed and Sealed this

Thirtieth Day of November, 2010

David J. Kappos
*Director of the United States Patent and Trademark Office*

Column 28
Line 22, Delete "Polydispers.," and insert -- Polydisperse., --, therefor.

Column 31
Line 3, Delete "(Nothingham," and insert -- (Nottingham, --, therefor.